(12) United States Patent
Stevens

(10) Patent No.: US 9,953,120 B2
(45) Date of Patent: Apr. 24, 2018

(54) RELATIVE TIMING CHARACTERIZATION

(71) Applicant: UNIVERSITY OF UTAH RESEARCH FOUNDATION, Salt Lake City, UT (US)

(72) Inventor: Kenneth S. Stevens, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 181 days.

(21) Appl. No.: 13/945,775

(22) Filed: Jul. 18, 2013

(65) Prior Publication Data

US 2015/0026653 A1  Jan. 22, 2015

Related U.S. Application Data

(63) Continuation-in-part of application No. 13/945,843, filed on Jul. 18, 2013.

(60) Provisional application No. 61/672,865, filed on Jul. 18, 2012, provisional application No. 61/673,849, filed on Jul. 20, 2012.

(51) Int. Cl.
G06F 17/50 (2006.01)

(52) U.S. Cl.
CPC ........ G06F 17/505 (2013.01); G06F 17/5031 (2013.01); G06F 2217/84 (2013.01)

(58) Field of Classification Search
CPC . G06F 17/505; G06F 17/5031; G06F 2217/84
USPC ....................................................... 716/108
See application file for complete search history.

(56) References Cited

U.S. PATENT DOCUMENTS

| | | | |
|---|---|---|---|
| 5,650,938 A | 7/1997 | Bootehsaz et al. | |
| 6,005,416 A | 12/1999 | Beakes et al. | |
| 6,058,252 A | 5/2000 | Noll et al. | |
| 6,442,739 B1 | 8/2002 | Palermo et al. | |
| 6,763,506 B1 | 7/2004 | Betz et al. | |
| 8,065,647 B2 * | 11/2011 | Stevens ............... | G06F 17/5059 716/100 |

(Continued)

OTHER PUBLICATIONS

K. S. Stevens et al., An Asynchronous Instruction Length Decoder, Feb. 2001, pp. 217-228, vol. 36, No. 2, IEEE Journal of Solid State Circuits.

(Continued)

*Primary Examiner* — Jack Chiang
*Assistant Examiner* — Brandon Bowers
(74) *Attorney, Agent, or Firm* — Michael Best & Friedrich LLP

(57) ABSTRACT

Technology for relative timing characterization enabling use of clocked electronic design automation (EDA) tool flows is disclosed. In an example, a method can include a EDA tool identifying a relative timing constraint (RTC) of a cell in a circuit model between a point of divergence (pod) event and two point of convergence (poc) events, wherein the two poc events include a first poc event ($poc_0$) and a second poc event ($poc_1$). The EDA tool can generate a maximum target delay for a first poc event path between the pod event and the first poc event. The EDA tool can generate a minimum target delay for a second poc event path between the pod event and the second poc event. The EDA tool can then optimize the circuit model using the maximum target delay and the minimum target delay.

24 Claims, 24 Drawing Sheets

(56) References Cited

U.S. PATENT DOCUMENTS

| | | | |
|---|---|---|---|
| 8,239,796 B2* | 8/2012 | Stevens | G06F 17/5031 |
| | | | 716/101 |
| 2003/0088840 A1 | 5/2003 | Yonezawa et al. | |
| 2005/0246673 A1 | 11/2005 | Charlebois et al. | |
| 2006/0129959 A1 | 6/2006 | Mang et al. | |
| 2007/0288871 A1 | 12/2007 | McElvain et al. | |
| 2008/0201671 A1 | 8/2008 | Rejouan et al. | |
| 2009/0106719 A1 | 4/2009 | Stevens | |
| 2009/0210841 A1 | 8/2009 | Prakash et al. | |
| 2010/0269083 A1 | 10/2010 | Sinha et al. | |
| 2011/0161902 A1 | 6/2011 | Stevens et al. | |
| 2012/0042294 A1 | 2/2012 | Sarwary | |
| 2012/0144359 A1 | 6/2012 | Stevens et al. | |

OTHER PUBLICATIONS

A. Kondratyev et al., Design of Asynchronous Circuits Using Synchronous CAD Tools, Jul.-Aug. 2002, pp. 107-117, vol. 19, No. 4, IEEE Design & Test of Computers.

Y. Xu et al., Automatic Synthesis of Computation Interference Constraints for Relative Timing, 26th International Conference on Computer Design, Oct. 2009, pp. 16-22, IEEE, Lake Tahoe, CA.

K. S. Stevens et al., Characterization of Asynchronous Templates for Integration into Clocked CAD Flows, 15th IEEE Symposium on Asynchronous Circuits and Systems, May 2009, pp. 151-161, IEEE, Chapel Hill, NC.

K. S. Stevens et al., Relative Timing, Feb. 2003, pp. 129-140, vol. 11, issue 1, IEEE Transactions on Very Large Scale Integration (VLSI) Systems.

K. Van Berkel et al., The VLSI programming language Tangram and its translation into handshake circuits, Proceedings of the European Design Automation Conference, Feb. 1991, pp. 384-389, Amsterdam, Netherlands.

N. Andrikos et al., A Fully-Automated Desynchronization Flow for Synchronous Circuits, 44th ACM/IEEE Design Automation Conference, Jun. 2007, pp. 982-985, San Diego, CA.

J. Cortadella et al., Lazy Transition Systems and Asynchronous Circuit Synthesis With Relative Timing Assumptions, Feb. 2002, pp. 109-130, vol. 21, No. 2, IEEE Transactions on Computer-Aided Design of Integrated Circuits and Systems.

B. Quinton et al., Asynchronous IC Interconnect Network Design and Implementation Using a Standard ASIC Flow,. ICCD Proceedings of the 2005 IEEE International Conference on Computer Design: VLSI in Computers and Processors, Oct. 2005, pp. 267-274, San Jose, CA.

Cortadella et al., Synthesis of Asynchronous Control Circuits with Automatically Generated Relative Timing Assumptions, 1999 IEEE/ACM International Conference on Computer-Aided Design, Nov. 1999, pp. 324-331, San Jose, CA.

M. Ligthart, Asynchronous Design Using Commercial HDL Synthesis Tools, Sixth International Symposium on Advanced Research in Asynchronous Circuits and Systems, Apr. 2000, pp. 114-125, Eilat, Israel.

S. Stevens et al., CAD Directions for High Performance Asynchronous Circuits, 36th Design Automation Conference, Jun. 1999, pp. 116-121, New Orleans, LA.

Linder, D.H. et al., Phased Logic: Supporting the Synchronous Design Paradigm with Delay-Insensitive Circuitry, IEEE Transactions on Computers, Sep. 1996, 14 pages, vol. 45, Issue 9, Los Alamitos, CA, United States.

Beerel, P.A. et al., Proteus: An ASIC Flow for GHz Asynchronous Designs, IEEE Design & Test of Computers, Sep.-Oct. 2011, 16 pages, vol. 28, Issue 5, Los Alamitos, CA, United States.

International Preliminary Report on Patentability and Written Opinion for Application No. PCT/US2013/051156 dated Jan. 29, 2015 (12 pages).

International Preliminary Report on Patentability and Written Opinion for Application No. PCT/US2013/051160 dated Jan. 29, 2015 (11 pages).

Seshia et al.; "Modeling and Verifying Circuits Using Generalized Relative Timing"; In: Asynchronous Circuits and Systems, 11th IEEE International Symposium, Mar. 14-16, 2005, pp. 98-108, ISSA 1522-8681, see pp. 98-101, 105.

PCT/US2013/051156; filed Jul. 18, 2013; Stevens S. Kenneth; international search report dated Nov. 12, 2013.

PCT/US2013/051160; filed Jul. 18, 2013; Stevens S. Kenneth; international search report dated Nov. 6, 2013.

United States Patent Office Action for U.S. Appl. No. 13/945,843 dated Jul. 9, 2015, 14 pages.

United States Patent Office Final Action for U.S. Appl. No. 13/945,843 dated Jan. 15, 2016, 17 pages.

Extended European Search Report for Application No. 13819907.0 dated May 23, 2016 (10 pages).

Extended European Search Report for Application No. 13819908.8 dated May 23, 2016 (11 pages).

Xu et al., "Algorithms for automatic generation of relative timing constraints," The University of Utah, May 1, 2011, pp. 1-130.

Iizuka et al., "A Tool Set for the Design of Asynchronous Circuits with Bundled-data Implementation," Computer Design (ICCD), 2011 IEEE 29th International Conference, Oct. 9, 2011. pages 78-83.

Sotiriou "Implementing asynchronous circuits using a conventional EDA tool-flow," Design Automation Conference : DAC, Jun. 10, 2002, pp. 415-418.

United States Patent Office Action for U.S. Appl. No. 13/945,843 dated Jul. 27, 2016 (47 pages).

* cited by examiner

```
800
 802 agent INPUT  = lr.'c1.'la.'c2.lr.'la.    INPUT;
 804 agent OUTPUT =    c1.'rr. c2.ra.'rr.ra.OUTPUT;
 806 agent SPEC   = ( INPUT | OUTPUT ) \{c1, c2\};
```

FIG. 8

```
module linear_control (lr, la, rr, ra, ck, rst);
  input lr, ra, rst;
  output la, rr, ck;

AOI32X1TS lc0 (.A1(lr), .A2(ra_), .A3(y_), .B1(lr), .B2(la), .Y(la_));
  AOI32X1TS lc1 (.A1(lr), .A2(ra_), .A3(y_), .B1(ra), .B2(rr), .Y(rr_));
  MAND2X1TS lc2 (.A1(la), .A2(rr), .Y(y_));
  INVX1TS   lc3 (.I(la_), .Y(la));
  NOR2X1TS  lc4 (.A1(rr_), .A2(rst), .Y(rr));
  INVX1TS   lc5 (.I(ra), .Y(ra_));
  INVX1TS   lc6 (.I(la_), .Y(ck));

endmodule // linear_control
```

$$pod \mapsto poc_0 + m \prec poc_1$$

Local Implementation Constraints:

$lr+ \mapsto y\_- \prec la-$ $lr+ \mapsto y\_- \prec rr-$ $lr+ \mapsto rr+ \prec y\_-$ $lr+ \mapsto la+ \prec y\_-$

Timed Protocol Constraints:

$lr+ \mapsto la+ \prec ra+$ $lr+ \mapsto rr+ \prec lr-$

Bundled Data Constraints:

$lr_i+ \mapsto L_{i+1}/D \prec L_{i+1}/clk+$

Timing Paths Derived From RT Set:

$lr \to la\_ \to la$ $lr \to la\_ \to y\_$ $lr \to rr\_ \to rr$ $lr \to rr\_ \to y\_$

Must Cut Path:

Example Cycles in the Circuit:

Timing Graph Cut Commands for DAG Generation
    set_disable_timing -from B2 -to Y [find -hier cell *lc0]
    set_disable_timing -from A3 -to Y [find -hier cell *lc0]
    set_disable_timing -from B2 -to Y [find -hier cell *lc1]
    set_disable_timing -from A3 -to Y [find -hier cell *lc1]
    set_disable_timing -from A2 -to Y [find -hier cell *lc1]
    set_disable_timing -from B1 -to Y [find -hier cell *lc1]

Paths for Timing Driven Design Optimization set_min_delay 0.050 -from Ctl0/Ir -to L0/clk set_max_delay 0.090 -from Ctl0/Ir -to Ctl0/Ic0/A3
set_min_delay 0.035 -from Ctl0/Ir -to Ctl0/Ia
set_max_delay 0.090 -from Ctl0/Ir -to Ctl0/Ic1/A3
set_min_delay 0.045 -from Ctl0/Ir -to Ctl1/Ir
set_max_delay 0.090 -from Ctl0/Ir -to L1/D
set_min_delay 0.050 -from Ctl1/Ir -to L1/clk
set_max_delay 0.030 -from Ctl0/ra -to Ctl0/Ic1/A2 set_max_delay 0.090 -from Ctl1/Ir -to Ctl1/Ic0/A3
set_min_delay 0.035 -from Ctl1/Ir -to Ctl1/Ia
set_max_delay 0.090 -from Ctl1/Ir -to Ctl1/Ic1/A3
set_min_delay 0.045 -from Ctl1/Ir -to Ctl2/Ir
set_max_delay 0.100 -from Ctl1/Ir -to L2/D
set_min_delay 0.050 -from Ctl2/Ir -to L2/clk
set_max_delay 0.030 -from Ctl1/ra -to Ctl1/Ic1/A2 set_max_delay 0.090 -from Ctl2/Ir -to Ctl2/Ic0/A3
set_min_delay 0.035 -from Ctl2/Ir -to Ctl2/Ia
set_max_delay 0.090 -from Ctl2/Ir -to Ctl2/Ic1/A3
set_min_delay 0.045 -from Ctl2/Ir -to Ctl2/rr
set_max_delay 0.030 -from Ctl2/ra -to Ctl2/Ic1/A2

Constraints to not modify gates set_size_only -all_instances [find -hier cell *lc0]

set_size_only -all_instances [find -hier cell *lc1]

set_size_only -all_instances [find -hier cell *lc2]

set_size_only -all_instances [find -hier cell *lc3]

set_size_only -all_instances [find -hier cell *lc4]

set_size_only -all_instances [find -hier cell *lc5]

FIG. 17

```
                     1900 module c_element_nand (y, a, b);
      input  a, b;
      output y;

// behavioral description:
      //assign #2 y = (a & b) | (a & y) | (b & y);

wire   ab, ay, by;
      NAND2_B  c_element_nand0  (.A(a), .B(b), .Z(ab));
      NAND2_B  c_element_nand1  (.A(a), .B(y), .Z(ay));
      NAND2_B  c_element_nand2  (.A(b), .B(y), .Z(by));
      NAND3_B  c_element_nand3  (.A(ab),.B(ay),.C(by), .Z(y));

endmodule // c_element_nand
```

FIG. 19

```
  bi NAND-SM-001   a.NAND-SM-a01 + b.NAND-SM-0b1                        2010
  bi NAND-SM-a01   a.NAND-SM-001 + b.NAND-SM-ab1
  bi NAND-SM-0b1   a.NAND-SM-ab1 + b.NAND-SM-001
  bi NAND-SM-ab1                                       'c.NAND-SM-ab0
  bi NAND-SM-ab0   a.NAND-SM-0b0 + b.NAND-SM-a00
  bi NAND-SM-0b0                   b.NAND-SM-000 + 'c.NAND-SM-0b1
  bi NAND-SM-a00   a.NAND-SM-000                 + 'c.NAND-SM-a01
  bi NAND-SM-000   a.NAND-SM-a00 + b.NAND-SM-0b0 + 'c.NAND-SM-001
```

```
  bi NAND-BOOL-001   a.NAND-BOOL-a01 + b.NAND-BOOL-0b1                       2020
  bi NAND-BOOL-a01   a.NAND-BOOL-001 + b.NAND-BOOL-ab1
  bi NAND-BOOL-0b1   a.NAND-BOOL-ab1 + b.NAND-BOOL-001
  bi NAND-BOOL-ab1   a.NAND-BOOL-0b1 + b.NAND-BOOL-a01 + 'c.NAND-BOOL-ab0
  bi NAND-BOOL-ab0   a.NAND-BOOL-0b0 + b.NAND-BOOL-a00
  bi NAND-BOOL-0b0   a.NAND-BOOL-ab0 + b.NAND-BOOL-000 + 'c.NAND-BOOL-0b1
  bi NAND-BOOL-a00   a.NAND-BOOL-000 + b.NAND-BOOL-ab0 + 'c.NAND-BOOL-a01
  bi NAND-BOOL-000   a.NAND-BOOL-a00 + b.NAND-BOOL-0b0 + 'c.NAND-BOOL-001
```

FIG. 20

```
2100 function AND000        3    c    "a * b"
function AND0000       3    d    "a * b * c"
function AND00000      3    e    "a * b * c * d"
function AND000000     3    f    "a * b * c * d * e"
function NAND001       4    c    "not(a * b)"
function NAND0001      4    d    "not(a * b * c)"
function NAND00001     4    e    "not(a * b * c * d)"
```

FIG. 21

```
2300 agent C_ELEMENT_NAND =
( NAND001[a/a, b/b, ab/c]
| NAND001[a/a, y/b, ay/c]
| NAND001[b/a, y/b, by/c]
| NANDabc0[ab/a, ay/b, by/c, y/d]
) \{ ab, ay, by } ;
```

```
NAND2_A       NAND001    (.A(a),  .B(b),  .Z(c));
NAND2_B       NAND001    (.A(a),  .B(b),  .Z(c));
NAND2_C       NAND001    (.A(a),  .B(b),  .Z(c));
NAND2_D       NAND001    (.A(a),  .B(b),  .Z(c));
NAND2_E       NAND001    (.A(a),  .B(b),  .Z(c));
NAND2_F       NAND001    (.A(a),  .B(b),  .Z(c));
NAND2_H       NAND001    (.A(a),  .B(b),  .Z(c));
NAND2_I       NAND001    (.A(a),  .B(b),  .Z(c));
NAND2_J       NAND001    (.A(a),  .B(b),  .Z(c));
NAND2_K       NAND001    (.A(a),  .B(b),  .Z(c));
NAND2_L       NAND001    (.A(a),  .B(b),  .Z(c));
NAND2_M       NAND001    (.A(a),  .B(b),  .Z(c));
NAND2BAL_E    NAND001    (.A(a),  .B(b),  .Z(c));
NAND2BAL_H    NAND001    (.A(a),  .B(b),  .Z(c));
NAND2BAL_J    NAND001    (.A(a),  .B(b),  .Z(c));
NAND2BAL_L    NAND001    (.A(a),  .B(b),  .Z(c));
NAND3_A       NAND0001   (.A(a),  .B(b),  .C(c),  .Z(d));
NAND3_B       NAND0001   (.A(a),  .B(b),  .C(c),  .Z(d));
NAND3_C       NAND0001   (.A(a),  .B(b),  .C(c),  .Z(d));
NAND3_D       NAND0001   (.A(a),  .B(b),  .C(c),  .Z(d));
NAND3_E       NAND0001   (.A(a),  .B(b),  .C(c),  .Z(d));
NAND3_F       NAND0001   (.A(a),  .B(b),  .C(c),  .Z(d));
NAND3_H       NAND0001   (.A(a),  .B(b),  .C(c),  .Z(d));
NAND3_I       NAND0001   (.A(a),  .B(b),  .C(c),  .Z(d));
NAND3_J       NAND0001   (.A(a),  .B(b),  .C(c),  .Z(d));
NAND3_K       NAND0001   (.A(a),  .B(b),  .C(c),  .Z(d));
```

```
rtc = rtc0: y+ => ay- < a-;
rtc = rtc0: y+ => ay- < by+;
rtc = rtc1: y+ => by- < b-;
rtc = rtc1: y+ => by- < ay+;
```

2600

```
agent FORK = a.('b.'c.FORK + 'c.'b.FORK);

agent FORK3 = a.('b.('c.'d.FORK3 + 'd.'c.FORK3)
        + 'c.('b.'d.FORK3 + 'd.'b.FORK3)
        + 'd.('b.'c.FORK3 + 'c.'b.FORK3));
```

2700

```
                  2800 agent C_ELEMENT_NAND_DI =
    ( NAND001[a/a, b/b, ab/c]
    | NAND001[a/a, y1/b, ay/c]
    | NAND001[b/a, y2/b, by/c]
    | NANDabc0[ab/a, ay/b, by/c, y0/d]
    | FORK3[y0/a, y/b, y1/c, y2/d]
    ) \{ ab, ay, by, y0, y1, y2 } ;

rtc = rtc0: y0+ => ay+ < a-;
    rtc = rtc0: y0+ => ay+ < by-;
    rtc = rtc1: y0+ => by+ < b-;
    rtc = rtc1: y0+ => by+ < ay-;
```

FIG. 28

```
                2900 set_size_only -all_instances [find -hier cell c_element_nand0]
set_size_only -all_instances [find -hier cell c_element_nand1]
set_size_only -all_instances [find -hier cell c_element_nand2]
set_size_only -all_instances [find -hier cell c_element_nand3]
```

ENDPOINT:       $in0      c_element_nand1/A
ENDPOINT:       $in1      c_element_nand2/A PINMAP:   c_element_nand    a    $in0
PINMAP:   c_element_nand    b    $in1
```

FIG. 30

```
3100
PROVIDES:      $in0-$out     c_element_nand0/A
PROVIDES:      $in1-$out     c_element_nand0/B PINMAP:    c_element_nand y   $out
```

FIG. 31

```
3200
set GATE_DELAYS_1    0.075
set GATE_DELAYS_2    0.150
set GATE_DELAYS_3    0.225
```

FIG. 32

```
3300
module smp (lr, la, rr, ra, clk, rst);
   input  lr, ra, rst;
   output la, clk, rr;

wire   ra_;

assign la = clk;
   assign rr = clk;

NAND2_B          smp0 (.A(ra), .B(~rst), .Z(ra_));
   c_element_nand smp1 (.a(lr), .b(ra_), .y(clk));

endmodule // c_element_nand
```

```
rtc = rtc0: $i1/y+ => $i1/ay- + m < $i1/a-;
set_max_delay $GATE_DELAYS_1 -rise_from $i1/c_element_nand3/Z
                             -fall_to $i1/c_element_nand3/B
set_min_delay $GATE_DELAYS_2 -rise_from $i1/c_element_nand3/Z
                             -fall_to $i1/c_element_nand1/A
#margin $GATE_DELAYS_1 -rise_from $i1/c_element_nand3/Z
                       -fall_to $i1/c_element_nand3/B
                       -rise_from $i1/c_element_nand3/Z
                       -fall_to $i1/c_element_nand1/A
```

```
DELAY    $lr-$rr    320     ps
DELAY    $lr-$la    283     ps
CYCLETIME           1207    ps
ENERGY              64.8    nJ
```

FIG. 35

RELATIVE TIMING CHARACTERIZATION

RELATED APPLICATIONS

This application claims the benefit of and hereby incorporates by reference U.S. Provisional Patent Application Ser. No. 61/672,865, entitled "Method for Characterizing Timed Circuit Modules for Compatibility with Clocked EDA Tools and Flows", filed Jul. 18, 2012. This application claims the benefit of and hereby incorporates by reference U.S. Provisional Patent Application Ser. No. 61/673,849, entitled "Method for Timing Driven Optimization of IC Systems from Timing Characterized Modules using Clocked EDA Tools", filed Jul. 20, 2012. This application claims the benefit of and hereby incorporates by reference co-pending U.S. patent application Ser. No. 13/945,843, entitled "RELATIVE TIMING ARCHITECTURE", filed Jul. 18, 2013.

BACKGROUND

Circuit timing can impact the power, performance, noise, and area of a circuit. Timing can be adjusted by many alternative circuit design styles, which can provide benefits over industry standard clocked design methods and technology. Timing can also be a primary impediment to the commercialization and adoption for these alternative circuits. Asynchronous circuit design is an example of a circuit family that uses alternative timing. At a circuit and architectural level, asynchronous design uses a continuous timing model, whereas clocked design uses a discrete model of time based on clock cycles.

Two general methods for signal sequencing have emerged in the design community: Clocked and asynchronous. Clocked design is founded upon frequency based protocols that define discrete clock periods. Clocked methods contain combinational logic (CL) between latches or flip-flops creating pipeline stages that are controlled by a common frequency. All other methods besides clocked methods can be considered "asynchronous", including but not limited to methods that employ handshake protocols, self-resetting domino circuits, and embedded sequential elements, such as static random-access memory (SRAM), dynamic random-access memory (DRAM), read-only memory (ROM), or programmable logic arrays (PLA). Asynchronous elements can contain state-holding circuits, such as sequential controllers, domino gates, or memory elements. The arrival of inputs to an asynchronous circuit may not be based on a global clock frequency. Delays through an asynchronous circuit can vary based on function, application, manufacturing variations, and operating parameters, such as temperature and voltage fluctuations.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 8 illustrates an efficient linear pipeline controller specification in accordance with an example.

FIG. 10 illustrates a Verilog implementation of an efficient linear pipeline controller using a 130 nanometer (nm) Artisan Library in accordance with an example.

FIG. 11 illustrates a representation of a path based relative timing constraints in accordance with an example.

FIG. 12 illustrates a set of relative timing constraints to hold for the efficient linear pipeline controller of FIG. 9 to conform to the linear pipeline controller specification in FIG. 8 in accordance with an example.

FIG. 13 illustrates a set of timing paths derived from a subset of the timing constraints in FIG. 12 and a design architecture used to generate cycle cuts for the asynchronous control circuit of FIG. 10 in accordance with an example.

FIG. 14 illustrates cycles in the circuit of FIG. 10 in accordance with an example.

FIG. 15 illustrates a set of timing graph cuts that create a timing graph that is a directed acyclic graph (DAG) for the circuit of FIG. 10 in accordance with an example.

FIG. 16 illustrates a set of delay constraints sufficient to perform timing driven optimization and evaluation when the controller in FIG. 10 is used in the design example of FIG. 3 in accordance with an example.

FIG. 17 illustrates a set of size only constraints for the controller of FIG. 10 in accordance with an example.

FIG. 19 illustrates a characterized design module of a C-Element of FIG. 18 specified in a Verilog cell library mapped to a 180 nm (nm) International Business Machines Corporation (IBM) cell library in accordance with an example.

FIG. 20 illustrates a formal Calculus of Communicating Systems (CCS) semi-modular and Boolean model of a two input NAND gate in accordance with an example.

FIG. 21 illustrates a formal Calculus of Communicating Systems (CCS) header function file for defining boolean functions and function name mappings in accordance with an example.

FIG. 22 illustrates a header function file for a C-Element of FIG. 18 to map cell names in a library to a formal model including pin name mappings in accordance with an example.

FIG. 23 illustrates a formal model for a design module for a C-Element of FIG. 18 in Calculus of Communicating Systems (CCS) in accordance with an example.

FIG. 24 illustrates casual paths between inputs and outputs of a design for a C-Element of FIG. 18 generated by a formal verification tool in accordance with an example.

FIG. 28 illustrates delay-insensitive relative timing constraints for a C-Element of FIG. 18 using a FORK element in accordance with an example.

FIG. 29 illustrates a set of do not modify constraints for a C-Element of FIG. 18 in accordance with an example.

FIG. 30 illustrates a set of endpoint mappings for inputs for a C-Element of FIG. 18 in accordance with an example.

FIG. 31 illustrates a set of input signal pins that map to output pins for a C-Element of FIG. 18 in accordance with an example.

FIG. 32 illustrates delays for a C-Element of FIG. 18 specified as Tool Command Language (Tcl) variables operable for use in Synopsys Design Constraint scripts in accordance with an example.

FIG. 33 illustrates a design using a C-element for the controller of FIG. 3 when relative timing endpoints exist outside of a current module in accordance with an example.

FIG. 34 illustrates relative timing constraints and mapped constraints for a controller of FIG. 3 using self-contained constraints in accordance with an example.

FIG. 35 illustrates a post-layout design report with performance and power values in accordance with an example.

Figure 1:
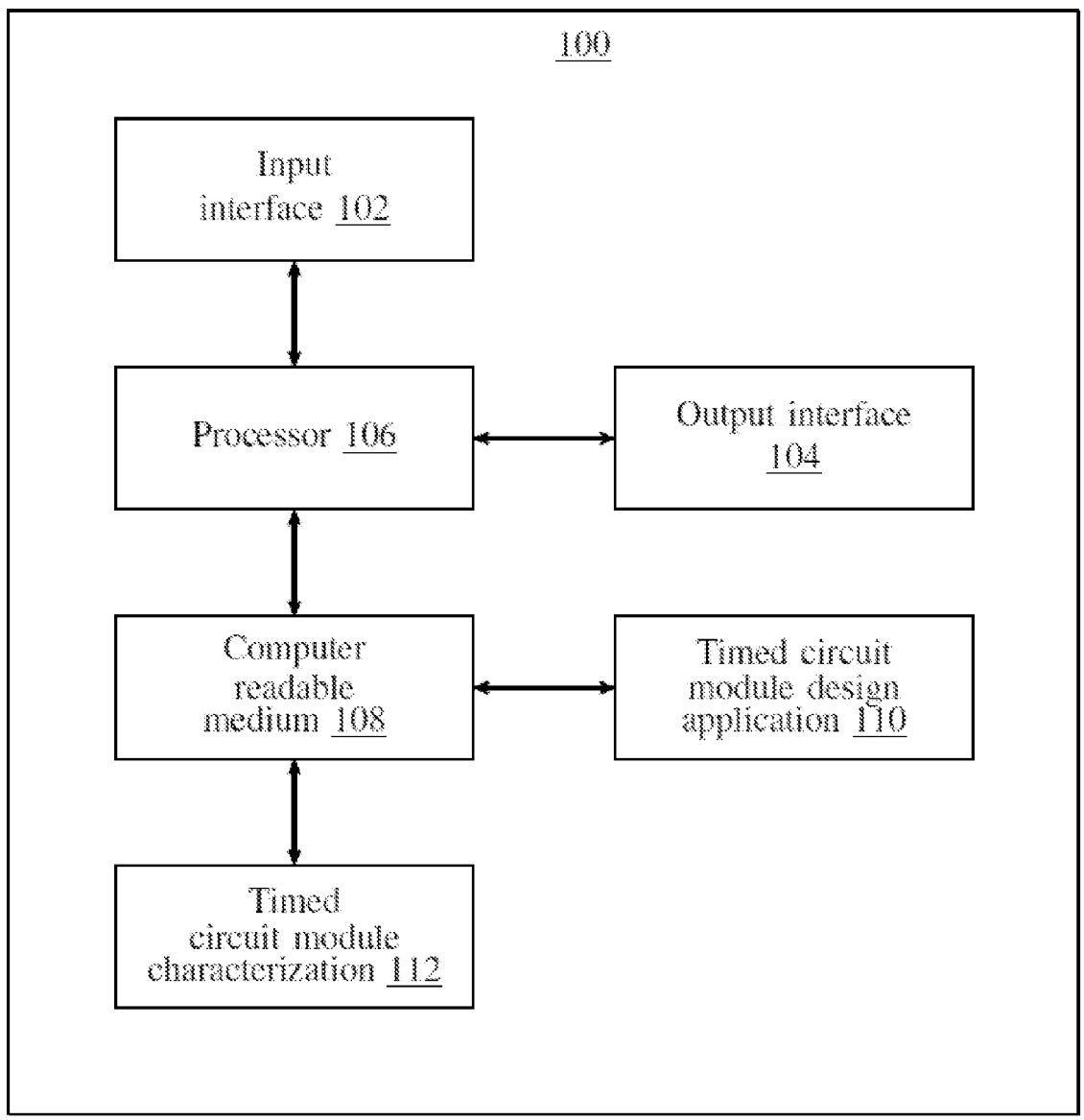
FIG. 1 illustrates a block diagram of a timed circuit module characterization system using clocked electronic design automation (EDA) tools and flows in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion can be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "set" refers to a collection of elements, which can include any natural number of elements, including one, zero, or higher integer values.

Reference throughout this description to "an example" means that a particular feature, structure, or characteristic described in connection with the example is included in at least one embodiment of the present invention. Thus, appearances of the phrases "in an example" in various places throughout this specification are not necessarily all referring to the same embodiment.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

EXAMPLES OF THE INVENTION

An initial overview of technology improvements is provided below and then specific technology examples are described in further detail later. This initial summary is intended to aid readers in understanding the technology more quickly, but is not intended to identify key features or essential features of the technology, nor is it intended to limit the scope of the claimed subject matter.

Clocked design dominates the electronic design automation (EDA) industry largely due to EDA's ability to enable high productivity. High productivity can be achieved by employing a methodology that restricts timing correctness to a very small number of predefined sequential cells, primarily the flip-flop and latch. These predefined cells can be characterized for the timing conditions that are used for design correctness, such as setup and hold times. The timing critical issues in a clocked design can converge at the flip-flops and latches.

This convergence has resulted in the timing requirements of the flip-flops and latches becoming directly integrated into the computer aided design (CAD) algorithms used in the EDA industry based on a clocked design methodology. While this directly integration of timing into algorithms simplifies clocked design, the algorithms can inhibit the application of circuits that employ other timing methods.

The technology (e.g., EDA tools, methods, computer circuitry, and systems) described herein can characterize a design module in a way that allows design module timing to be supported throughout the EDA design tool flow. The result of the characterization can have at least two results. First, a set of circuit constraints can be created that are passed throughout the tool flow to direct the operation of the CAD algorithms in commercial EDA tools to properly operate on the characterized modules. Second, modifications to standard circuit timing libraries that the EDA tools can use to evaluate circuit timing can be enhanced based on this characterization to enable accurate static timing analysis when the delay arcs through library gates are cut to produce a directed acyclic graph (DAG). When characterized, general design modules, including asynchronous circuits, can be embedded into a clocked design or used to build systems using a standard commercial clock-based EDA tool flow. The characterization can enable timing algorithmic support to components used in a design, in a manner similar to that of flip-flops and latches that are directly supported by the clock-based tool flow.

As previously described, technology can be used for characterizing a timed circuit module and creating constraints that allow the timed circuit module to be integrated into current clocked-based EDA tools for timing driven design flow optimization. A circuit module that is dependent on timing for correct operation can be designed with a formal specification of the circuit's behavior. This circuit module can be evaluated for conditions where circuit and wire delays can result in incorrect operation or performance requirements may not be met. A circuit timing graph can then be represented as a directed acyclic graph and timing constraints can be created that drive standard timing driven commercial design optimization and validation CAD tool algorithms in the clock-based EDA flow.

The following provides a brief overview of the technology previously described. The technology (e.g., EDA tools, methods, computer circuitry, and systems) described herein is based on a theory of relative timing (RT). From a common timing reference, relativistic delays must hold across signal paths or signal frequencies, such that the maximum delay (max-delay) through one path must be less than the minimum delay (min-delay) through another path. In addition, a margin of separation may be required between delays of the two paths. One path, typically the min-delay path, may be a delay based upon a fixed frequency (such as a dock) rather than the delay down a signal path. Relative timing can be therefore represented with the Equation 1.

$$pod \mapsto poc_0 + m \prec poc_1 \qquad \text{Equation 1}$$

A variable pod can represent a timing reference or event. If pod is an event, a logic path exists between the point of divergence (pod) and both points of convergence ($poc_0$ and $poc_1$). If pod is a timing reference, such as a clock, the timing reference can be common to both $poc_0$ and $poc_1$. A value m can be a margin or minimum separation between the events, and the value m may be zero or negative. For Equation 1 to hold, the maximum path delay from event pod to event $poc_0$ plus margin m may be less than the minimum path delay from event pod to event $poc_1$. In an example, the analogous delay of a frequency based signal, such as a dock, may be substituted for a path delay such that pod can be a rising clock edge and $poc_1$ can be the subsequent rising edge of the clock.

In another example, a method for characterizing an asynchronous sequential circuit module for inclusion in the commercial EDA tools can be performed. The characterization circuit can be fully characterized for all timing conditions to hold and for the design to operate correctly given the delays and behavior of a desired circuit environment, whether the environment is clocked or asynchronous. The characterization can express delays based on relative timing by creating constraints that are path based or frequency based from pod to poc0 and poc1. Performance constraints of a similar form can be added. A subset of the full constraint set can be selected for the characterization and for later use in the EDA design flows. Cycle cutting can be performed based on a subset of selected constraints to create a timing graph that is a DAG (directed acyclic graph) which can used throughout the EDA tool flow. The technology (e.g., circuit) can be characterized for delays. The delays can be used to modify cells in a liberty (.lib) file to allow a more accurate evaluation of cyclic circuit delays. A full set of timing and cycle cutting constraints can be stored. Various subsets of selected constraints can be translated to into a form that can be used directly in the operation of different timing driven EDA tools in the design and validation process. For example, a format for the selected constraints can include a .cstr format, which can be used by clock-based EDA tools.

In another configuration, a computer-readable medium can be provided comprising computer-readable instructions that, upon execution by a processor, cause the processor to perform the operations of the method of characterizing a timed circuit module suitable for inclusion into the industry standard EDA CAD flow.

In another embodiment, a system can include a processor and the computer-readable medium can be operably coupled to the processor. The computer-readable medium can include instructions that, upon execution by the processor, perform the operations of a method of characterizing a timed circuit module suitable for inclusion into the industry standard EDA CAD flow.

The following provides additional details and examples of the technology previously described. FIG. 1 illustrates a block diagram of a timed circuit module characterization system 100. The timed circuit module characterization system 100 may include a computing device of any form factor, which may include an output interface 104, an input interface 102, a computer-readable medium 108, a processor 106, a timed circuit module design application 110, and timed circuit module characterization application 112 that can characterize the timed circuit modules from 110. Different and additional components may also be incorporated into timed circuit module characterization system 100.

The output interface 104 provides an interface for outputting information for review by a user of the timed circuit module characterization system 100. For example, the output interface 104 can include an interface to a display, a printer, a speaker, or similar output device. The display can be a thin film transistor display, a light emitting diode display, a liquid crystal display, or any of a variety of different displays. The printer can be any of a variety of printers. The speaker can be any of a variety of speakers. The timed circuit module characterization system 100 can have one or more output interfaces that use a same or a different interface technology.

The input interface 102 provides an interface for receiving information from the user for entry into timed circuit module characterization system 100. The input interface 102 can use various input technologies including, but not limited to, a keyboard, a pen and touch screen, a mouse, a track ball, a touch screen, a keypad, one or more buttons, or similar input device to allow the user to enter information into the timed circuit module characterization system 100 or to make selections presented in a user interface displayed on the output interface 104. The input interface 102 may provide both input and output interfaces. For example, a touch screen both allows user input and presents output to the user.

The computer-readable medium 108 can be an electronic holding place or storage for information so that the information can be accessed by the processor 106. The computer-readable medium 108 can include, but is not limited to, any type of random access memory (RAM), any type of read only memory (ROM), any type of flash memory, or similar medium, such as magnetic storage devices (e.g., hard disk, floppy disk, or magnetic strips), optical disks (e.g., compact disk (CD) or digital versatile disk (DVD) or digital video disk), smart cards, or flash memory devices. The timed circuit module characterization system 100 can have one or more computer-readable media that use the same or a different memory media technology. The timed circuit module characterization system 100 can also have one or more drives that support the loading of a memory media, such as a CD or DVD.

The processor 106 can execute instructions. The instructions can be carried out by a special purpose computer, logic circuits, or hardware circuits. Thus, the processor 106 can be implemented in hardware, firmware, software, or any combination of these methods. The term "execution" is the process of running an application or the carrying out of the operation called for by an instruction. The instructions can be written using one or more programming language, scripting language, assembly language, or similar language. The processor 106 can execute an instruction, meaning that the processor can perform the operations called for by that instruction. The processor 106 can be operably couple with the output interface 104, the input interface 102, and the with the computer-readable medium 108 (e.g., memory) to receive, to send, to process, and to store information. The processor 106 can retrieve a set of instructions from a permanent memory device and copy the instructions in an executable form to a temporary memory device, such as some form of RAM. The timed circuit module characterization system 100 can include a plurality of processors that use the same or a different processing technology.

The timed circuit module design application 110 can perform operations associated with designing an integrated circuit module. Some or all of the operations described may be embodied in timed circuit module design application 110. The operations can be implemented using hardware, firmware, software, or any combination of these mechanisms. In an example, as illustrated by FIG. 1, the timed circuit module design application 110 can be implemented in software stored in the computer-readable medium 108 and accessible by the processor 106 for execution of the instructions that embody the operations of the timed circuit module design application 110. The timed circuit module design application 110 may be written using one or more programming languages, assembly languages, scripting languages, or similar language.

The timed circuit module characterization 112 can perform operations associated with characterizing an integrated circuit module. Some or all of the operations described may be embodied in timed circuit module characterization 112. The characterization can operate on the timed circuit modules from the timed circuit module design application 110. The operations for the timed circuit module characterization can be implemented using hardware, firmware, or software. In an example, as illustrated by FIG. 1, the timed circuit module characterization 112 can be implemented in software stored in the computer-readable medium 108 and accessible by the processor 106 for execution of the instructions that embody the operations of the timed circuit module design application 110. The timed circuit module characterization 112 may be written using one or more programming languages, assembly languages, scripting languages, or similar language. In an example, the timed circuit module characterization 112 can include various algorithms and stored in various representations in the computer readable medium 108.

Figure 2:
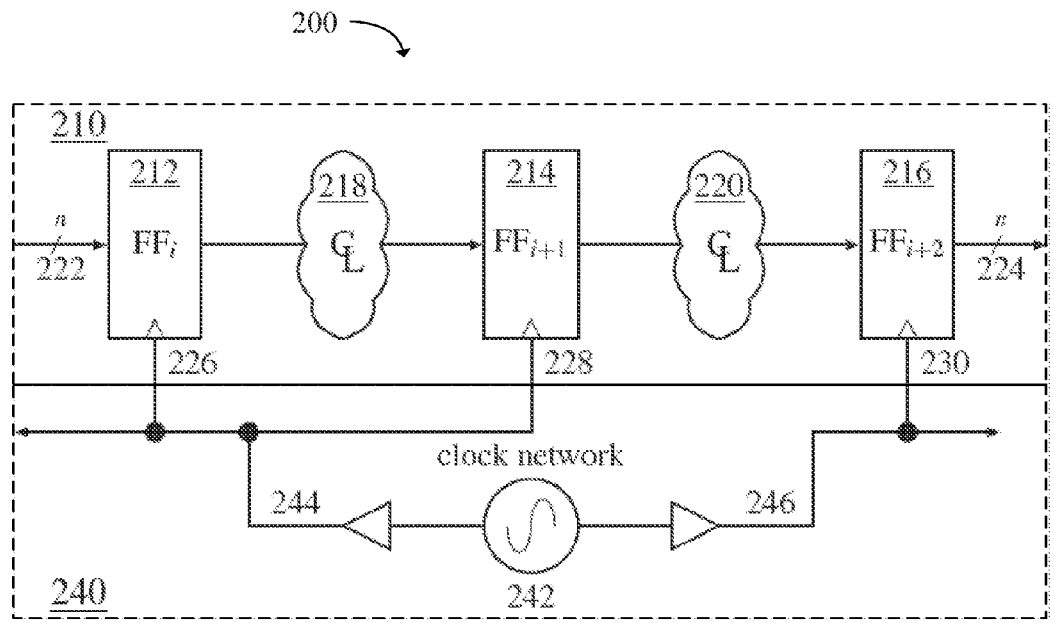
FIG. 2 illustrates a clocked pipeline in accordance with an example.

Clocked-based design can be directly supported with computer-aided design (CAD) as used by the electronic design automation (EDA) industry. FIG. 2 illustrates an example of a circuit that is supported with clocked-based EDA tools. The circuit can include of a data path 210 and a clock distribution network 240. The data path 210 can include of a first register 212 (e.g., flip-flop), a second register 214, and a third register 216, a first combinational logic (CL) block 218 and a second combinational logic block 220. The first register 212 can accept an input 222 and store the value based on a clock event on signal 226. The third register 216 can output an output 224. The inputs and outputs of the registers and combinational logic blocks can use multiple data lines n (e.g., a bus). The output of the first register 212 can be presented to the input of the first combinational logic 218 and a result can be produced at the output of the first combinational logic 218. When a clock event, such as a rising edge, occurs on a clock input 228 for the second register, the second register 214 can capture the result produced by the first combinational logic 218. Likewise, the output of the second register 214 can be presented to the input of the second combinational logic 220 and a result can be produced at the output of the second combinational logic 220. When a clock event, such as a rising edge, occurs on a clock input 230 for the third register, the third register 216 can capture the result produced by the second combinational logic 220. The clock network 240 can include logic 242 that produces a periodic waveform at a specified frequency. This periodic waveform signal can be distributed across a clock network 244 and 246 to the registers in a design. The traditional EDA tools can support timing driven optimization and synthesis of the combinational logic blocks 218 and 220 based on the target cycle times of the clock generator 242. The clock distribution networks 244 and 246 can maintain the frequency from the clock generator 242 with a low skew between different clock tree paths 244 and 246.

Figure 3:
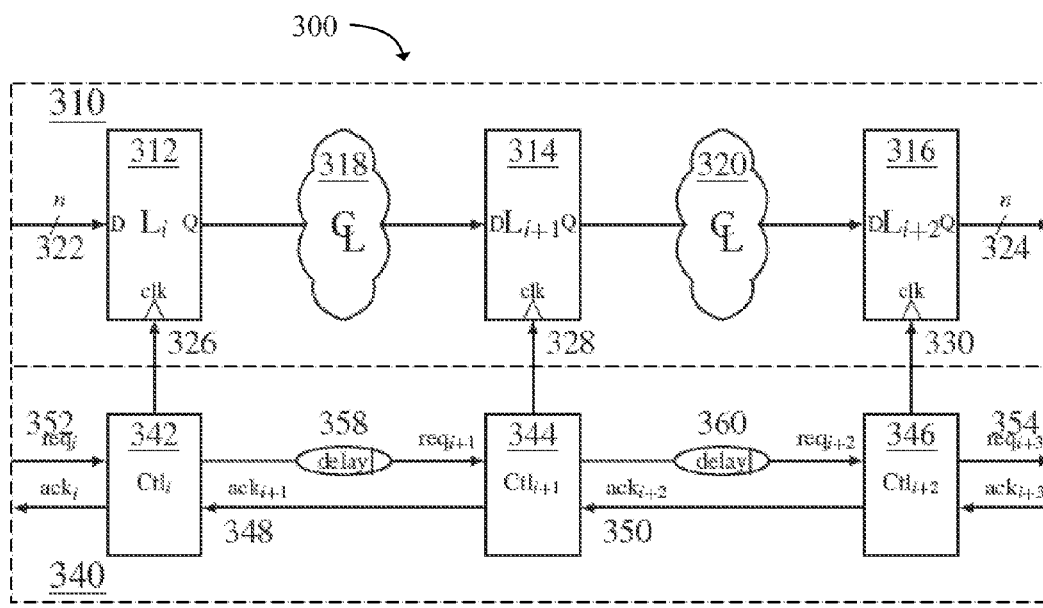
FIG. 3 illustrates a timed asynchronous pipeline in accordance with an example.

FIG. 3 illustrates an example of an asynchronous circuit 300 of a system with timed circuit modules, which may not be supported by traditional clocked-based EDA. In the example of FIG. 3, a separate data path 310 and a control network 340 are used. The data path 310 can include a first register 312 (e.g., latch, such as data or delay flip-flop (D flip-flop) or latch configured with a data input, "D," and a data output, "Q"), a second register 314, and a third register 316, a first combinational logic block 318 and a second combinational logic block 320. The first register 312 can accept an input 322 and store the value based on a clock event on a first register clock input 326. The third register 316 outputs an output 324. The inputs and outputs of the registers and combinational logic blocks can use multiple data lines n (e.g., a bus). The output of the first register 312 can be presented to the input of the first combinational logic 318 and a result can be produced at the output of the first combinational logic 318. When a clock event, such as a rising edge, occurs on a second register clock input 328, the second register 314 can capture the result produced by the first combinational logic 318. Likewise, the output of the second register 314 can be presented to the input of the second combinational logic 320 and a result can be produced at the output of the second combinational logic 320. When a clock event, such as a rising edge, occurs on a third register clock input 330, the third register 316 can capture the result produced by the second combinational logic 320. The registers 312, 314 and 316 in an asynchronous pipeline can be latches, flip-flops, dynamic gates, or any other memory element.

Rather than use a clock network 240 as shown in FIG. 2 to generate clock events, an asynchronous circuit can use timed circuit modules that employ handshaking protocols to determine when to store data in the registers, as shown in control network 340 of FIG. 3. The asynchronous network shown in FIG. 3 can be similar in structure to the clocked network of FIG. 2. However different structures, such as delay insensitive pipelines or other asynchronous network designs, can be used. This handshaking network can produce the clock signals that control storage of data in the datapath 310. These events can occur with any delay so long as the data at the input of the registers is stable before a clock event occurs. The control network 340 can include a first control module 342, a second control module 344, and a third control module 346. Each data path between latches in the data path can include an associated control channel. An input control channel 352 can be associated with input data 322, a control channel 348 can be associated with a combinational path 318, a control channel 350 can be associated with data logic path 320, and the output 324 can be is associated with a control channel 354. Control channels can contain delay logic that is designed to match the delay of signal propagation and data functions of an associated data path. This delay logic includes structures that steer the handshake signals on control channels and create delay, such as delay module 358 and 360. The control channel 348 includes a delay element 350 and the control channel 350 includes a delay element 360. The delay element shown in FIG. 3 is placed on a forward handshake path, but may be placed on the backward path depending on the protocol used. Each of the timed circuit modules 342, 344, and 346 used for the handshake control can implement a function that determines the handshake protocol relationship between the clock signal and the input and output control channels of the modules. Many possible protocols can be used.

Figure 4:
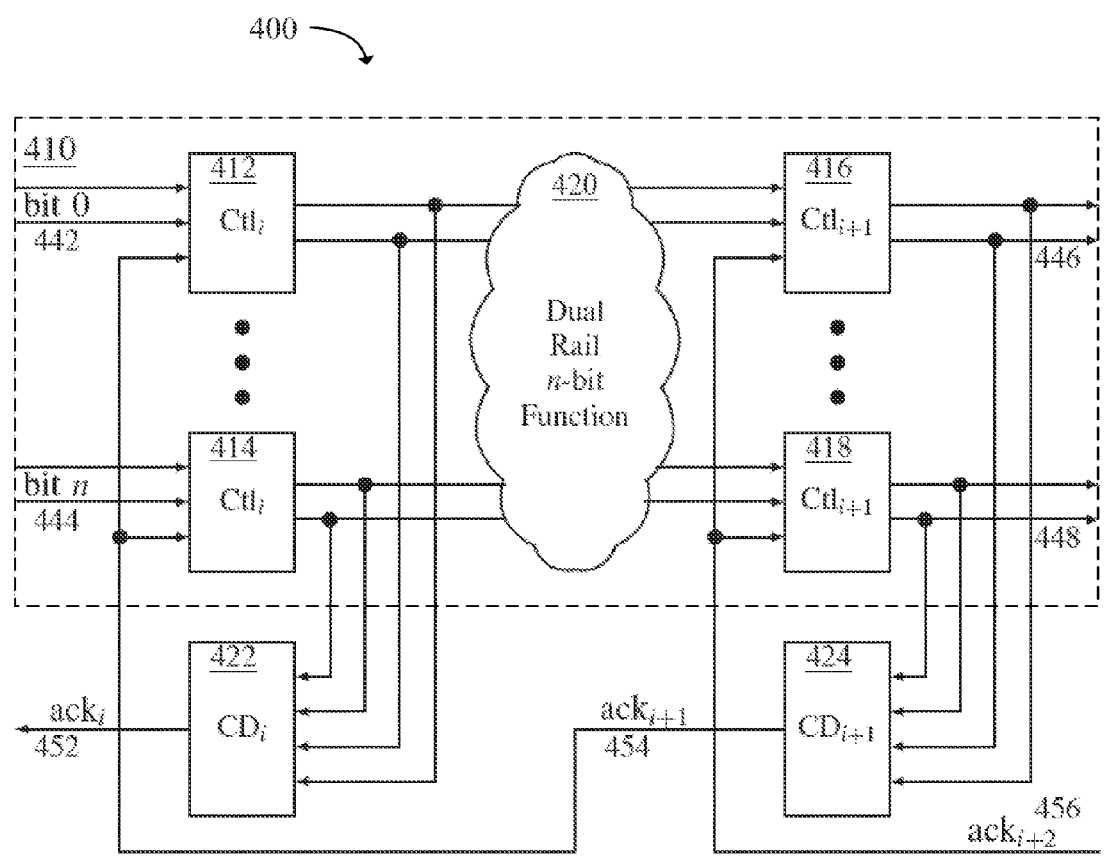
FIG. 4 illustrates a timed delay-insensitive asynchronous pipeline in accordance with an example.

FIG. 4 illustrates an example of a delay insensitive asynchronous circuit 400 of another system with timed circuit modules, which may not be supported by traditional clocked EDA. In FIG. 4, the control and data path 410 can be integrated together. Each data bit in the integrated path 410 can be encoded with a communication protocol that identifies data values as well as validity of the data. The integrated path can be encoded as dual-rail, one-of-four, m-of-n codes, delay-insensitive minterm synthesis (DIMS), or any other similar code. The data path 410 can include a first control bank 412 through 414 and a second control bank 416 through 418. The control logic can also include completion detection (CD) logic 422 and 424. The CD logic 422 can assert an acknowledgment (ack$_i$) 452 when all values in the first control bank 412 through 414 are valid, and unassert the ack$_i$ 452 when the data values are unasserted. Likewise, the CD logic 422 can assert a subsequent ack (ack$_{i+1}$) 454 when the second control bank 416 through 418 are all valid, and unassert ack$_{i+1}$ 454 when data values are idle. Data can be stored in the control banks according to the protocol implemented. The controllers can implement various protocols with differing amounts of concurrency between the input and output channels. In an exemplary protocol, data can be stored in a control bank when the acknowledgment from the following stage is unasserted and an input is encoded as having valid data. Likewise the output of a control bank can indicate invalid data when data inputs are invalid and the acknowledgment is asserted. Therefore, in this exemplary protocol, the first control bank 412 through 414 can accept inputs 442 through 444. When ack$_{i+1}$ 454 becomes unasserted, the data can be output from the control registers into a dual-rail n-bit function 420 and the completion detection module 422 can assert acknowledgment ack$_i$ 452. The output of the first register set 412 through 414 can pass through an encoded function module 420, which can encode a function using dual-rail, m-of-n codes, DIMS, or any other similar code. When the data is encoded as valid to the next control bank 416 through 418 and the input signal 456 is unasserted, the function results can be stored in register bank 416 through 418. The control banks may also perform some of the combinational function logic.

The clocked-based EDA flow may only integrate timing for a very few sequential cells, such as flip-flops and latches. Therefore, any other module that is not combinational logic between the flip-flops or latches may be characterized using the timed circuit module characterization of FIG. 1 in order to receive support of the timing driven algorithms in the EDA tool flow. The application of a timed circuit module characterization for compatibility with the clocked EDA tool flow is not limited to the modules used in the examples illustrated by 300 and 400 of FIGS. 3 and 4, but can be generally extended to any timed design module.

Design modules that are sequential circuits or logic modules can have combinational cycles of timed circuit modules that may be characterized for compatibility with docked-based EDA tools and flows. As illustrated by an asynchronous bundled data path of the asynchronous circuit 300, the control modules 342, 344 and 346 can be characterized. Logic between these control modules and any barrier latching structure that are pre-characterized in the design flow can be represented as modules that can also be characterized as described herein. The barrier latching structures characterized by the design flow may use D flip-flops, latches, master slave latches, or any other sequential element. The logic between these modules, as illustrated in FIG. 3, can be characterized to include delay modules 358 and 360. Control steering logic, such as fork and join elements (see FIG. 27) and other logic, can also be represented as modules to be characterized by the clocked-based flow. As illustrated by the delay insensitive asynchronous circuit 400, the control elements to be characterized can include the control banks 412 through 414, 416 through 418, and the completion detection logic 422 and 424. Since the additional logic can be between the control banks, the entire system can be modeled for characterization.

Figure 5:
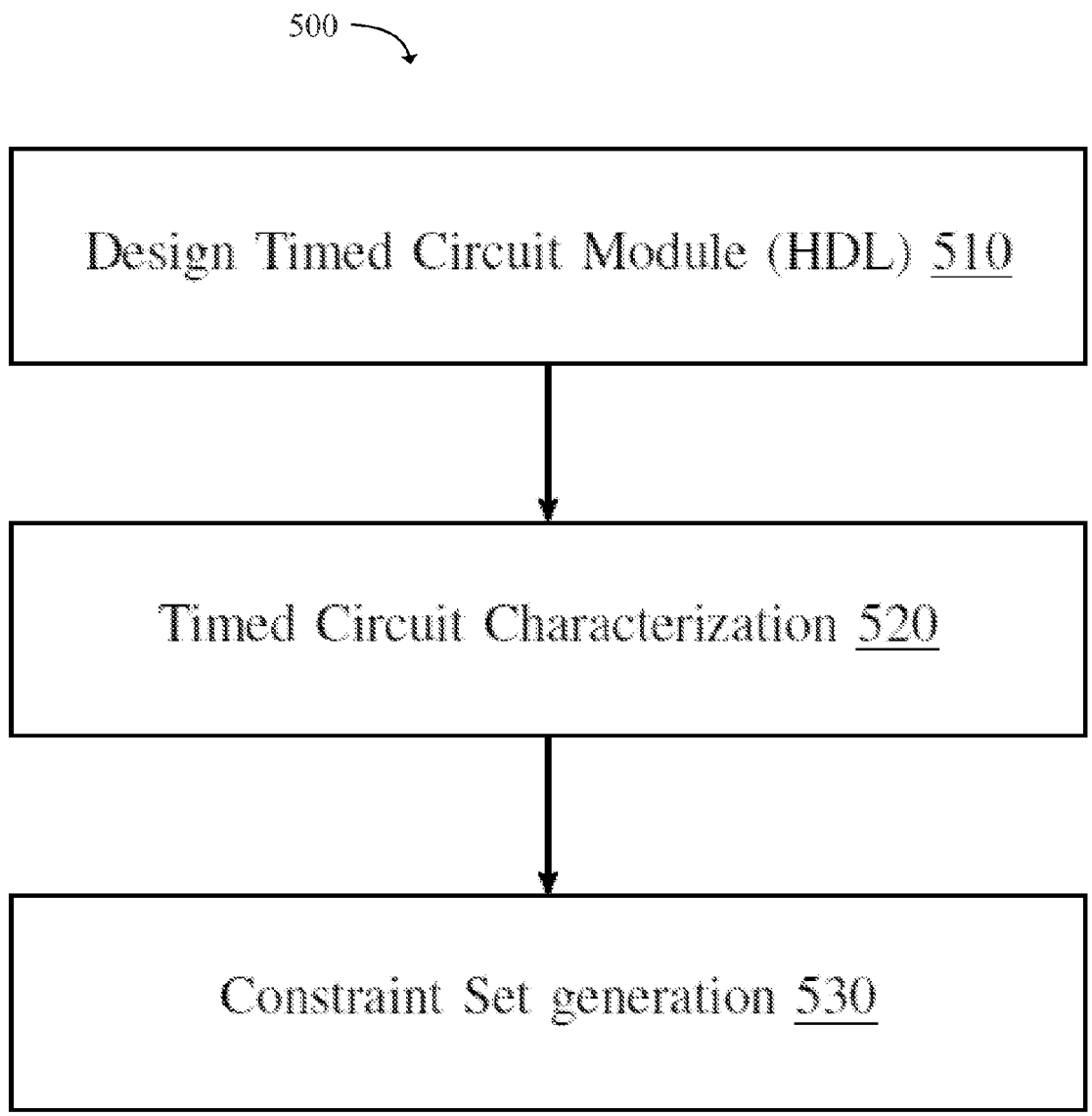
FIG. 5 illustrates a flow chart of a timed circuit module characterization process in accordance with an example.

FIG. 5 illustrates the characterization process 500. A timed circuit module can be designed 510, which is discussed further with reference to FIG. 6. In an example, the timed circuit module can be encoded in a hardware description language (HDL). For example, the hardware description language may use Verilog, very-high-speed integrated circuits (VHSIC) HDL (VHDL), or any other hardware description language. The timed circuit module parameters and architecture style can be defined or selected. For example, the delay insensitive pipeline 400 can be selected; the bundled data pipeline 300 can be selected; or a mixture of pipeline structures, or any other architectural style or protocol can be composed. Other parameters, such as operating voltages, local constraints, different frequencies, and protocol constraints can also be identified. General types of parameters that may be defined or selected can include the number and complexity of the timed circuit modules, local constraint parameters, protocol constraint parameters, or timing constraint parameters. The parameters can be applied to produce a timed circuit or logic. The timed circuits can be characterized 520, which is discussed further with reference to FIG. 7. These timed circuit modules can be designed in operation 510 plus include any logic between the barrier latching structures and timed circuits that have been characterized in operation 510. For example, the first control module 342, second control module 344, and third control module 346 can be characterized, which can imply that delay logic 358 and 360 can also be characterized. The control modules that have been characterized can have the characterization information stored out in various formats as generated constraint sets 530 passed to the EDA tools. These constraint sets can be used as inputs during various stages in the design of a system or architecture that employs instances of the characterized control module in the design, as discussed further with reference to FIG. 7. The full constraint set can be saved as a text file, in a database (e.g., SQL), in an EDA infrastructure format (e.g., milkyway database), or in any other format to represent the constraint sets.

Figure 6:
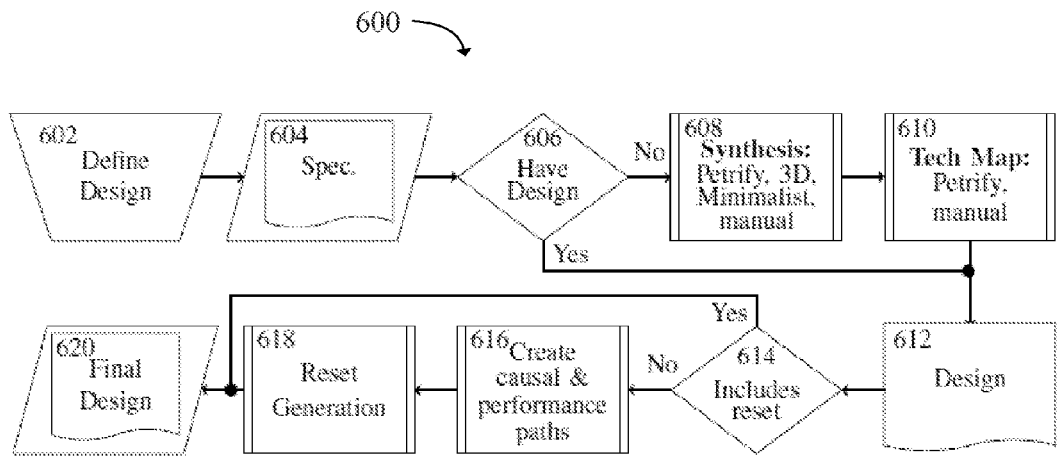
FIG. 6 illustrates a flow chart of creating a timed asynchronous controller design in accordance with an example.

FIG. 6 illustrates a flow chart of a timed control circuit design process 600 for asynchronous controllers. Additional, fewer, or different operations may be performed, depending on the configuration. The order of the operations in the timed control circuit design process 600 is not intended to be limiting. In an example, the timed control circuit design process 600 may be implemented by executing timed circuit module design application 110. The control modules (such as described in FIG. 3 and FIG. 4) can be designed 602. The parameters of the control module can be defined, including the protocol, inputs and outputs, and other aspects for module design. Then a formal specification for the design can be created 604. A determination can be made whether a valid design already exists 606. If so, operations 608 and 610 can be skipped. If a valid design does not exist, a controller (i.e., control module) can be synthesized from the specification 608. In an example, synthesis can use CAD tools, such as Petrify, 3D, minimalist, MEAT, or any other synthesis CAD system. The design can also be manually generated to meet the requirements of the specification. The design can be technology mapped 610 to a specific design library being used in the fabrication process. A technology mapped design 612 can be created. These technology mapped designs can include state logic, and may contain combinational cycles that may include reset logic to be correctly initialized. In an operation 614, the design can be evaluated to determine if the design correctly resets 614. If so, operations 616 and 618 can be skipped. If the design does not correctly reset, causal delay paths and performance paths through the circuit may be identified and created 616. Causal delay paths and performance paths information can be used to generate reset logic 618. The reset logic can be created 618 for the circuit and corresponding elements can be added or modified. If the causal delay paths and the performance paths are provided, the paths can be used to optimize the reset generation for delay. A description of the circuit can be created for a final design in a hardware description language, such as Verilog or any other hardware description language.

Figure 7:
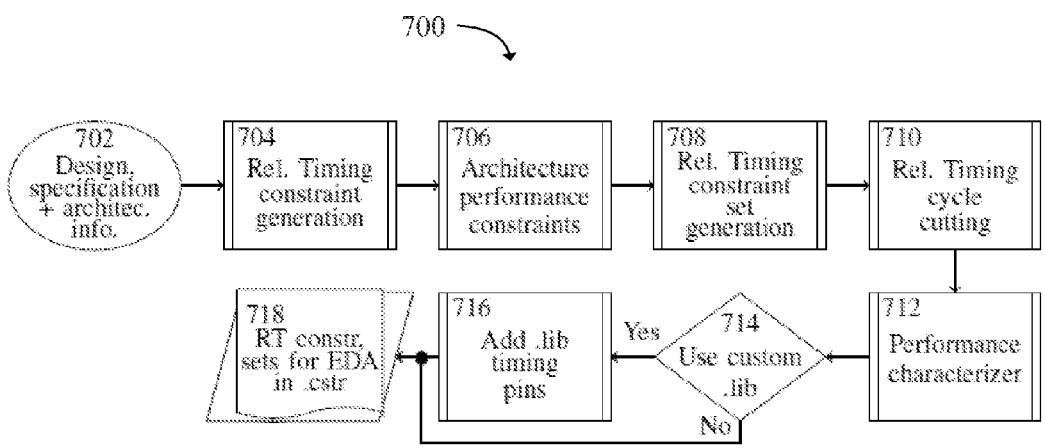
FIG. 7 illustrates a flow chart of characterizing a timed asynchronous controller circuit using relative timing and creating the constraint information for use in clocked-based electronic design automation (EDA) tool flows in accordance with an example.

FIG. 7 illustrates a flow chart of a design characterization process. Additional, fewer, or different operations may be performed, depending on the configuration. The order of the operations in the design characterization process 700 is not intended to be limiting. In an example, the design characterization process 700 may be implemented by executing asynchronous design characterization 112. The control modules and related elements used in a design (such as described in FIG. 3 and FIG. 4) can be characterized 700. Data for the characterization 702 can be provided. This characterization data can include, but is not limited to, the design specification, the design in a hardware description language, various descriptions of the cell library used in the design, performance parameters for the design, architectural cycles and related must-cut paths, or any other information to perform the design characterization. A complete set of relative timing constraints to meet timing correctness using an unbounded delay model can be generated for the design 704. These relative timing constraints can be broken into various sets depending on their properties, such as speed-independent constraints and delay-insensitive constraints. The relative timing constraints can be used for the circuit to operate correctly. Additional architectural performance constraints 706 can be added to the design. These additional architectural performance constraints can be represented as relative timing constraints. While these additional architectural performance constraints may not be necessary for correct operation, the additional architectural performance constraints can be used to guarantee performance of the design. Other additional timing constraints as needed for the design can be added in operation 706. A subset of the relative timing constraints and architectural performance constraints can be selected 708 for a timing driven synthesis and a place and route portions of the EDA tool flow. These relative timing constraints can be used for generating cycle cutting and constraint set generation through a main process of the design flow. Multiple sets may be employed. The design module can be evaluated for cycles, and each timing cycle in the circuit, represented as timing constraints, can be cut 710 in order to create a DAG. The relative timing paths specified in operation 708 may not be cut as part of relative timing cycle cutting, as a cycle cut may not allow the paths to be followed by the EDA tools. Thus, the relative timing paths in operation 708 can be used to drive the cycle cutting operation 710. Paths to be cut in order to break external architectural cycles can also be evaluated and constraints for these paths can be generated. A set of timing cuts can be generated to create a timing graph that is a DAG, which can also preserve the timing paths in the generated subset of the relative timing constraints and architectural performance constraints 708. The performance of the controller can be characterized 712 via a performance characterizer. The design can be characterized for cycle time, forward and backward latency, pipelining properties, rise and fall times of internal gates, or any other characterization parameters helpful to the design process. A determination can be made to use the characterization information to modify the cell library delay file 714. The cell library delay file can be represented in a liberty (.lib) format. A side pin with delays can be added to particular gates in the library 716 to aid in a correct evaluation of cyclical delays and delays where timing paths are cut. The results of the design characterization process can be created and stored 718. The results can include cycle cut information, information limiting the ability of the tools to modify cells in the design, relative timing constraints, min and max delay constraints and their associated delay targets, or validation requirements for the design. In an example, the results of the design characterization process can be represented in a format supported by the Synopsys design constraint (.sdc) file format, such as a .cstr format, or any other format that can be used by the EDA tools. The results information can include several different subsets that are used by different aspects of the design optimization and validation processes used in the EDA tool flows.

For example, asynchronous controllers can be characterized as library macro cells that can be arbitrarily inserted into the design of a larger system. For instance, the controllers can include: (a) a specification 800 of the protocol implemented by each controller, as shown in FIG. 8; (b) a circuit realization 900 implemented as a sequential asynchronous controller, as shown in FIG. 9; and (c) a hardware description language (HDL) implementation 1000 of a sequential asynchronous controller, as shown in FIG. 10.

Controllers can be implemented using various synthesis tools, as well as a custom design.

The concurrency and functional behavior of a sequential circuit can be formally specified. FIG. 8 contains an exemplary embodiment of the specification 800 for a burst-mode control circuit specified in Calculus of Communicating Systems (CCS). In this example, a statement 802 can be used to specify the input channel and the input's synchronization with the output channel. A statement 804 can define the behavior of the output channel and the output's synchronizations. A statement 806 can combines the two agents (e.g., inputs and output agents) in parallel to create a top level specification. The specification can be in any language suitable for sequential control specifications, including petri-nets, state graphs, state machines, Communicating Sequential Processes (CSP), CCS, or any other language for a specification.

Figure 9:
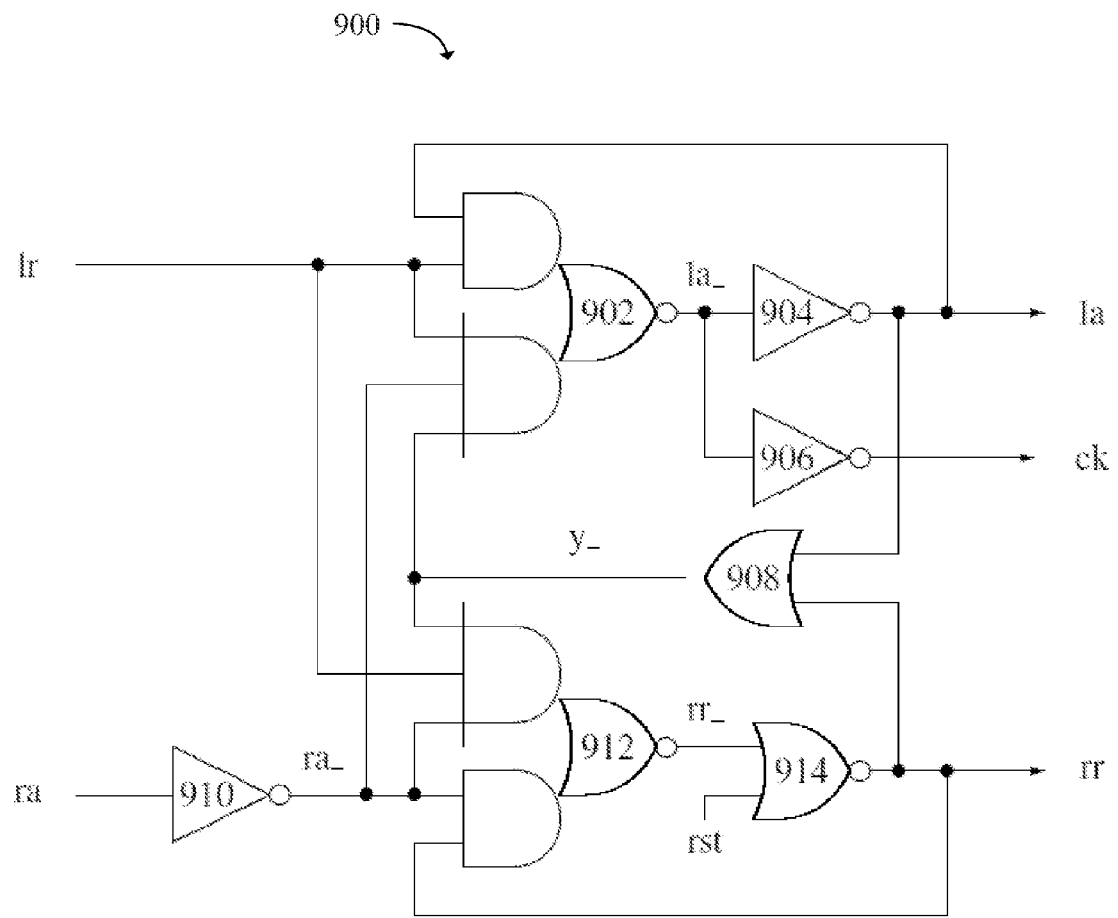
FIG. 9 illustrates a circuit implementation of the efficient linear pipeline controller of FIG. 8 in accordance with an example.

FIG. 9 illustrates a circuit 900 that implements the control modules 342, 344, and 346 in FIG. 3. Many different methods and circuit styles for implementing control modules can be used, such as state graphs and signal transition graphs (STG). In an example, the circuit implementation 900 of the specification 800 is illustrated in FIG. 9. The control module circuit (i.e., handshake circuit) includes of seven combinational logic gates: Static logic gates, such as inverters 904, 906, and 910 and NOR gates 908 and 914, and complex gates, such as AND-OR-invert gates (AOI gates) 902 and 912. AOI gates are two-level compound or complex logic functions constructed from the combination of one or more AND gates followed by a NOR gate. Any other type of gate may also be used such as dynamic logic, domino gates, latches, or majority gates. The logic of module 900 can implement a sequential function. Sequential logic can be implemented with feedback, as shown. Feedback can create cycles in the topology of the circuit, as is the case with the cycles through gates 902 and 904; gates 902, 904, and 908; gates 912 and 914; and gates 912, 914, and 908. Sequential circuits can also contain state that exists by using latches, dynamic gates, or majority gates. A circuit can be described using a hardware description language, such as Verilog. In an example, the logic represented by 900 can be mapped to a 130 nanometer (nm) Artisan cell library 1000 with structural Verilog, as illustrated in FIG. 10. Then, the circuit design can be characterized 700 (FIG. 7).

Relative timing is a mathematical timing model that enables accurate capture, modeling, and validation of heterogeneous timing requirements in general circuits and systems. Timing constraints can be made explicit in these designs, rather than using traditional implicit representations, such as a clock frequency, to allow designers and tools to specify and understand the implications and to manipulate the timing of more general circuit structures and advanced clocking techniques. Timing constraints that affect the performance and correctness of a circuit can be transformed into logical constraints rather than customary real-valued variables or delay ranges. Logical constraints can support a compact representation and allow more efficient search and verification algorithms to be developed, which can greatly enhance the ability to combine timing with optimization, physical placement, and validation design tools. As a result, the way in which timing is represented by designers and CAD tools can be altered in a way that still allows the EDA tools to perform timing driven optimization, but also gives fine-grain control over the delay targets in a system. This approach of using explicit timing constraints can provide significant power-performance advantages in some circuit designs.

Timing in a circuit can determine both performance and correctness. Relative timing can be employed to represent both correctness and performance conditions of control modules. For example, the timing constraints can be represented as logical expressions that make certain states unreachable. The states that are removed can contain circuit failures, thus timing can be necessary for circuit correctness. Thus, if all timing is met in a physical realization, the circuit can operate without failure. The performance constraints may not be critical for correct circuit operation, but rather performance constraints can ensure performance targets are met. FIG. 11 illustrates a general form for path based relative timing employed for specifying relative timing constraints 1100 (also represented in Equation 1). Equation includes a point-of-divergence (pod) and a point-of-convergence (poc). The point of divergence pod may be any event that creates other events in a system, such as a clock event or a handshake signal. The point of convergence consists of two events $poc_0$ and $poc_1$, and margin m. The two poc events are ordered in time for the circuit to operate correctly, or to achieve a desired performance. The maximum delay between event pod and event $poc_0$ plus margin m can be less than the minimum delay from event pod to event $poc_1$.

The full set of timing conditions can be explicitly represented for the design in a logical and behavioral domain. The timing constraints can be generated for both handshaking control and a complete system, which can include the data path, function units, and storage elements. FIG. 12 illustrates the speed-independent timing constraints 1200 for the circuit of FIG. 9 to operate correctly in a system. The constraints 1200 can include three classes: Local implementation constraints, timed protocol constraints, and bundled data constraints. The set of delay-insensitive constraints (not shown) can be part of a full design characterization flow. The number and type of constraints can be determined based on the gates used for the implementation, the concurrency of the protocol, or the system design. The bundled data constraints 1200 can be valid when the controller is used in the pipeline 300. These relative timing constraints can be generated in operations 704 and 706. These constraints can become part of the characterization information of the circuit and can be associated with the characterized circuit in the operation 718.

In FIG. 12, the signal label (e.g., la) followed by an underbar (_) can represent an enable low signal (e.g., la_), while the signal label without a subscript can represent an enable high signal (e.g., la). The minus sign (−) following the signal label can represent a falling edge of the signal (e.g., la−), while the plus sign (+) following the signal label can represent a rising edge of the signal (e.g., la+). The integer i+1 can represent an upstream design instance, while the integer i can represent the local design instance.

Asynchronous design characterization 112 (FIG. 1) can be used to create a set of constraints represented in a format that the EDA tool flow directly supports. This set of constraints can correctly constrain and optimize the power and performance of each gate in the design. This optimization can occur if a path-based timing constraint passes through each gate. Therefore, in the example controller 900, all of the gates 902 through 914 can have at least one timing arc (e.g., timing path) passing through each gate. Generating timing arcs through each gate of the controller may not be possible due to the structure of the controller, the controller's timing constraints, and constraints imposed by the clock-based EDA tools. For instance, the EDA tools can represent the timing graph of the circuit as a directed acyclic graph (DAG), whereas the circuit may contains cycles. Additionally, the statements used to employ timing driven optimization may cut the timing graph of the circuit at the endpoints. Other constraints can exist, such as the type of constraints supported by the tools that restrict the way the circuit can be constrained. Likewise, some of the constraints may be cyclic in nature and thus may not be fully supported within a system represented as a DAG.

The full set of timing constraints may not all be applied to a circuit simultaneously for optimization purposes. Therefore in an operation 708, subsets of the constraints generated in the operations 704 and 706 can be created for usage throughout various parts of the design and validation flow based on the structure of the circuit and the system in which the circuit is used. Additionally, a subset of a relative timing constraint path may be used as a constraint path in various parts of the flow. For example, the constraint sets can be generated 708. These constraint sets can include the set of constraints used for relative timing cycle cutting in an operation 710. In an example, a subset of the constraints used for cycle cutting can include the first two Local Implementation Constraints (e.g., lr+↦ y_−≺ la− and lr+↦ y_−≺ rr−) and the Bundled Data Constraint in the speed-independent timing constraints 1200. The timing paths can be derived from these three constraints of the circuit 900, along with a must-cut path 1300, as illustrated in FIG. 13. Some of the timing paths can be sub-paths of the relative timing (RT) constraints from which the timing paths are derived.

A timing graph of the circuit can be created 710 that is a directed acyclic graph (DAG) by breaking some of the timing paths through the circuit. In an example, breaking some of the timing paths can disable a timing path from the input to the output of a gate. The gate delay information can be stored in a liberty (.lib) file format. Generating a timing graph of the circuit can include as an input, the set of timing paths provided by an operation 708 and a set of must-cut paths provided by an operation 702 and the HDL representation of the design module 1000. The example timing paths 1300 from FIG. 13 can be used in operation 710 and can include a must cut path that can be provided in an operation 702. The timing paths passed to a cycle cutting algorithm may not be cut, and the must-cut paths may be cut. Assuming the timing paths 1300 are passed as relative timing paths, and the path ra→ra_→rr_→rr passes as a must-cut path, four timing cycles 1400 can result, as shown in FIG. 14. Each timing cycle 1400 can be cut to create a DAG. Many possible cuts for the timing cycles can exist. However, the only choice to cut the la_→la→la_ cycle while preserving the lr→la_→la path may be to cut the timing arc from la to la_ in gate 902.

In an example, the explicit cycle cutting command allowed by the EDA tools can be the set_disable_timing command. These commands can be placed in a Synopsys design constraint (.sdc) file or similar type of file. FIG. 15 illustrates a set of commands 1500 to cut all four cycles, and to cut the must-cut path, while preserving all of the relative timing paths passed to the set_disable_timing command. Master pin names and instance names used in the command can be taken from library pin names of the Verilog HDL gates, as illustrated in FIG. 10. The format of the commands 1500 is representative, and any valid timing graph cut commands understood by the clock-based EDA tools may be used.

A set of commands suitable for optimizing the design can also be created 708. FIG. 16 illustrates a set of constraints 1600 suitable for optimizing design 300. The set of commands 1600 can include commands that are understood by the EDA tool flows, which can perform timing driven power and performance optimization of a design. In this phase of the process, the gates in a circuit can have appropriate commands passing through the gates. The set_max_delay and set_min_delay commands can be understood by the EDA tools and can perform timing driven optimization. An operation 708 may also provide target delays for the commands 1600. The operation 712 can create a structural pipeline of controllers and simulate these controllers to generate target delays and performance values suitable for providing good delay targets for the characterized cells used in an architecture. The operation 712 can also provide modifications to a liberty file to help optimize and validate cyclic delays in a design while using static timing analysis. The operation 708 may iteratively simulate the design in order to modify the delay targets, as well as to characterize the circuit delays. In the operation 716, a new input pin can be added to each characterized module in the library, and the delays from the characterization can be added to the library from the new input pin to the output pin.

The final set of constraints can be generated 718. The results can be stored via computer readable medium 108 for use by a complete circuit system 100 in operation 708. The constraints generated through the timed circuit module characterization operation 112 can be tied to a design master in operation 708. Each instantiated design instance in an architecture can use these generated constraints to create a design optimized for power, performance, and timing correctness using the standard EDA tools.

FIG. 17 illustrates an additional set of constraints 1700 generated in an operation 718. These constraints to not modify gates 1700 can ensure that a characterized design is not functionally modified from what was characterized. Additional constraints from the design flow can created and saved in the operation 718.

Timing driven design optimizations and design validation have been primary impediments to design productivity when creating non-traditional design using methods, such as asynchronous circuits. A method of formally providing the timing constraints, characterizing the timing constraints for asynchronous design modules, and providing design information to integrate these asynchronous design modules into the EDA design flow (e.g., clock-based EDS design flow) supporting timing driven design optimization and validation has been described herein.

The technology described herein can be employed to characterize an asynchronous design module. An asynchronous controller can be designed, including a formal specification, as shown in FIG. 6. The circuit can have representations similar to those representation in FIGS. 8 through 10. These controllers can be characterized using relative timing based on model checking to guarantee a complete set of timing constraints as shown in FIG. 7. Example constraint sets and formats can be shown in FIGS. 11 through 14. Sets of characterization information can be generated for use in the design and validation of systems and architectures that employ these design modules. Example sets of characterization information can be shown in FIGS. 15 through 17. Based on the processes described herein, the asynchronous design module with behavior as specified in 800 can be characterized and inserted into an asynchronous architecture that uses the timing driven design and optimization algorithms created for clocked design in the EDA design flow.

Figure 18:
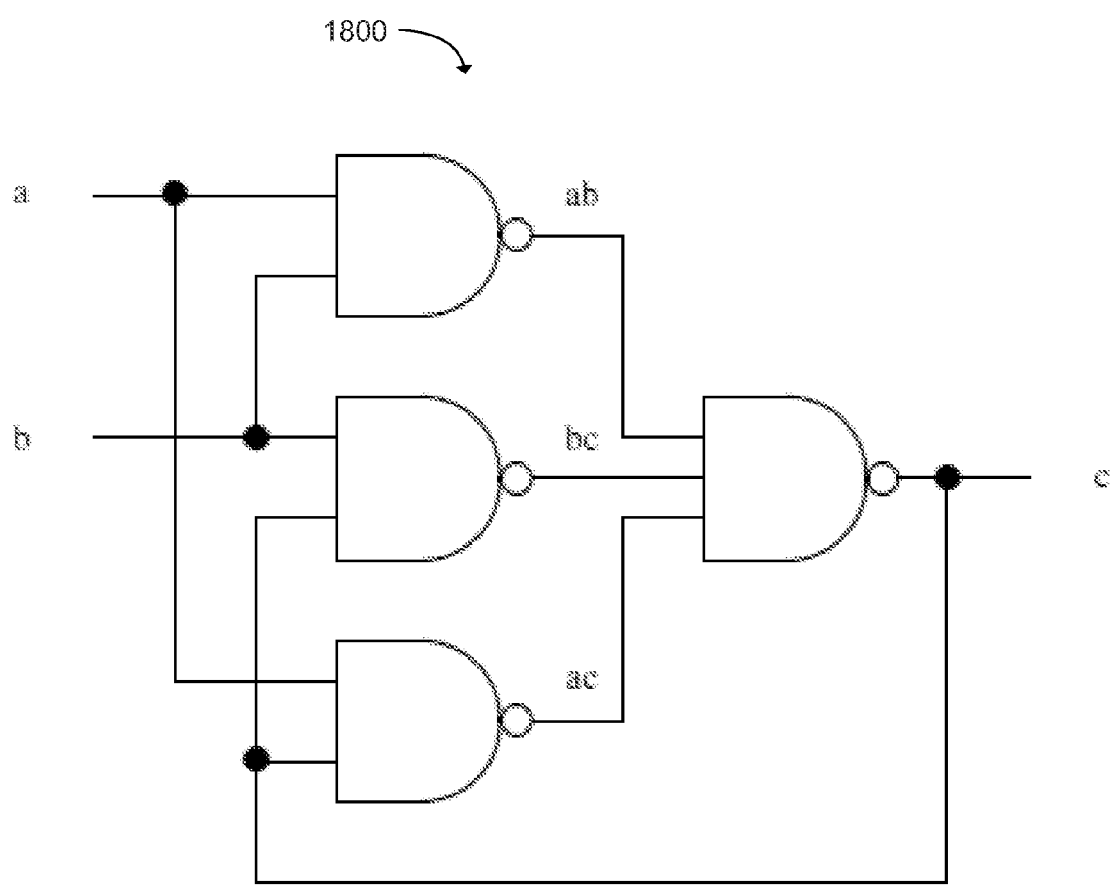
FIG. 18 illustrates a circuit implementation of a C-Element using four NAND gates in accordance with an example.

FIG. 18 illustrates another example of a circuit (e.g., a C-Element circuit using four NAND gates 1800), which can be characterized by the technology described herein. The flow or process described can be based on formal methods, which can generate proofs of correctness. The technology can use model checking engines, where axiomatizations are employed to prove conformance between models of a specification and an implementation. A Calculus of Communicating Systems (CCS) can be employed as the formalism for the illustration, but any formalism can work. Characterization can be based on formal verification, which can be based on a simulation of vector sets and timing employed.

A design module can be characterize and built from cells in a cell library. An example of a design module 1900 is a C-Element, which can be specified in Verilog, as illustrated in FIG. 19. Any other high level design description language that also supports structural representations may also be used. As illustrated, this design module can be mapped to an IBM 180 nm cell library where NAND2 is a 2-input NAND gate and NAND3 is a 3-input NAND gate. The "_B" extensions can be the drive strengths of the cells.

In the flow, a formal model of the cell library can be created along with header files and functions, which can be used in designing the circuit (e.g., the IBM 180 nm cell library). Creating the formal model can be automated using script (e.g., Perl scripts). In an example, two types of formal models for the cells in the cell library can include semi-modular models 2010 or boolean models 2020, as illustrated for the NAND2 models in FIG. 20. The semi-modular models may not allow inputs to disable outputs. The boolean model may allow outputs to be disabled. In illustration of the NAND2 models, a and b are inputs and 'c is the output, and the last three characters represent the voltage levels of a, b, and c where low level in a and b are '0' and high level is 'a' or 'b', and the output is represented as 0 or 1. Absence of an input transition in CCS can result from a blocked or disabled input, which can be represented as a transition to a failure state in other formal models.

Header functions can be created to aid in a mapping of the formal representations of the cell library. FIG. 21 illustrates a formal CCS header function file 2100 or header file 1. In the example, the header file can be created for the formal CCS functions that exist in the cell library for 2, 3, and 4-input AND and NAND gates. A naming convention can be chosen to map the boolean logic levels of the inputs and outputs of the function to specific states. For instance, if the inputs map to either 0 or to the pin name for low or high boolean values, and if the output maps to either 0 or 1 (for low or high voltages), a naming convention can be used that can include the name of the function, the index in the name where the input and output logic level is mapped, the name of the output, and the boolean function for the model. The illustration of the header file 1 2100 assumes that these static gates have only a single output, but other examples can be extended to include multiple output gates. In another example, another naming convention may also be used.

FIG. 22 illustrates a second header file 2200 or header file 2 used to map the cell names in the library to the formal model including pin name mappings. Cell name drive strengths can be mapped to a same formal model. The second header file 2200 is shown for two and three input NAND gates for a referenced IBM library (e.g., IBM 180 nm cell library). The specification can use a structural Verilog representation where the library cell is a master name, the CCS model is an instance name, and pin names are mapped in Verilog syntax between the master name and instance pin names. In other examples, other representations for header file 2 may also be used.

A formal model of the design module can be created using the formal models for each gate used in the design from the cell library. The translation of the formal model from the design module can also be automated. A fully technology mapped design can be provide as shown in c_element_nand 1900 of FIG. 19. A set of netlist values for each netlist in the design can provide the initial state used in the design. For example, the names of the inputs, outputs, and wires can be in a set (e.g. {~a ~b ~y ab ay by}). If the name is preceded by a tilde (~) then the state of the signal is a boolean 0, otherwise the state of the signal is a boolean 1. Other representations of the names can also be used. Sets for inputs and outputs can also be specified, as shown below in Expression 1, which can be directly derived from the module definition (1900 of FIG. 19).

input a,b;

output y;                                                  Expression 1

From the initial state and the input and output specification, a formal model 2300 of the design can be created, as illustrated in FIG. 23. The formal model of the module can be created from the Verilog design, the mapping and header files for the cell library being used, and the signal voltages. FIG. 23 illustrates the formal model representation 2300 of the formal design of the c_element in CCS, which can be suitable for a Concurrency Workbench and other tools that employ the CCS formalism.

Causal paths through the circuit can be created. For example, a formal CCS specification for the module can be provided. In CCS, a c-element specification can be represented as shown in Expression 2.

agent C_ELEMENT_SPEC=
  a·b·'y·C_ELEMENT_SPEC+
  b·a·'y·C_ELEMENT_SPEC;                                    Expression 2

A formal verification tool can be employed which can generate casual paths between inputs and outputs of the design, as illustrated in 616 of FIG. 6. The formal verification tool can use the formal representation of the module (C_ELEMENT_NAND (2300)) and the specification (C_ELEMENT_SPEC (Expression 2)). The result can be paths specified in a form illustrated in FIG. 24, where sequences 2400 are generated from input a and b to output y on both rising transitions (e.g., a+ and b+) and falling transitions (e.g., a− and b−).

A reset design optimized for power or performance can be generated, as illustrated in 618 of FIG. 6. The reset design optimization can use modules and headers of the formal model of the cell library, and reset design optimization can use the causal paths. Additional information for the reset design optimization can include performance path information and whether the primary inputs are known to be defined upon the reset. Any algorithm can be used to optimize the reset logic for a design using the causal paths.

Figures 25, 26, 27:
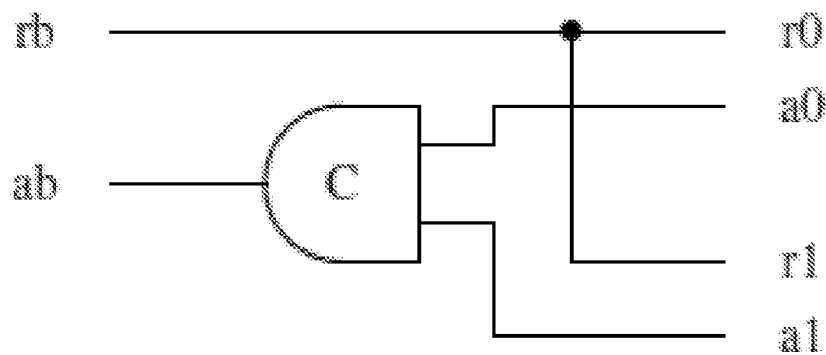
FIG. 25 illustrates speed independent relative timing constraints for a C-Element of FIG. 18 in accordance with an example.
FIG. 26 illustrates modeling of arbitrary delay on wire forks with a FORK element in accordance with an example.
FIG. 27 illustrates a circuit implementation of a join and fork template in accordance with an example.

Speed independent (SI) relative timing (RT) constraints can be created, as illustrated in 704 of FIG. 7. The formal models of the cell library (e.g., FIG. 20), the formal design representation (e.g., FIG. 23), and the formal specification (e.g., Expression 2) can be used to generate relative timing constraints (e.g., pod $\mapsto$ poc$_0$ < poc$_1$), which can be applied to the design to conform to the specification. The generated set of RT constraints 2500 can be sufficient and complete for the speed independent timing constraints, as illustrated in FIG. 25. A formalism can use "speed-independent" constraints, where gates have arbitrary delay, but wires have zero delay. FIG. 25 illustrates a set of RT constraints 2500 for the c-element using this formalism.

Delay-insensitive (DI) relative timing (RT) constraints can be created, as illustrated in 704 of FIG. 7. The speed independent relative timing constraints can be extended to model the circuit as a delay insensitive design. To generate delay-insensitive relative timing constraints, wires can also have arbitrary delay, as well as the gates. Arbitrary delay can be modeled on wire forks with a FORK element 2600, where a is an input, and b and c are outputs for the FORK, and b, c, and d are outputs for the FORK3, and the apostrophe (') before a variable represents the output and no apostrophe (') before a variable represents an input, as shown in FIG. 26. The fork can have one input (e.g., rb) and two outputs (e.g., r0 and r1), as illustrated in 2700 of FIG. 27. The order of the output used in the fork employed can be irrelevant, if a wire has multiple forks. A three way fork specification may also be employed. The generation of forks may also be automated. Conversely, a join can have two inputs (e.g., a0 and a1) (or multiple inputs) and one outputs (e.g., ab), and may use a gate (e.g., C-element gate), as illustrated in FIG. 27.

The forks can be inserted into the design to generate delay-insensitive relative timing constraints. FIG. 28 illustrates a modified design 2800 with the re-mapped speed-independent RT constraints based on signal renaming. Performing a verification on the new design can add two delay insensitive (DI) relative timing constraints, as shown in Expression 3. The "a 2" syntax indicates a multiple-cycle constraint. The "a 2" specifies the second rising event on signal a, and "b 2" specifies the second rising signal on input b. Expression 3 states that when y0 falls (−), signals a and b can rise, so signals a and b can have a greater delay than the wire delay to the inputs of the ay and by gates.

$$rtc=rtc2:y0-=>y1-<a2;$$

$$rtc=rtc3:y0-=>y2-<b2; \quad \text{Expression 3}$$

Characterization information can be generated in various sets. For example, 2500, 2600, 2800, and Expression 3 can be used to generate complete sets of characterized constraints. Some additional pin information can be included to meet EDA requirements, such as directed acyclic timing graphs, as specified herein.

Figure 38:
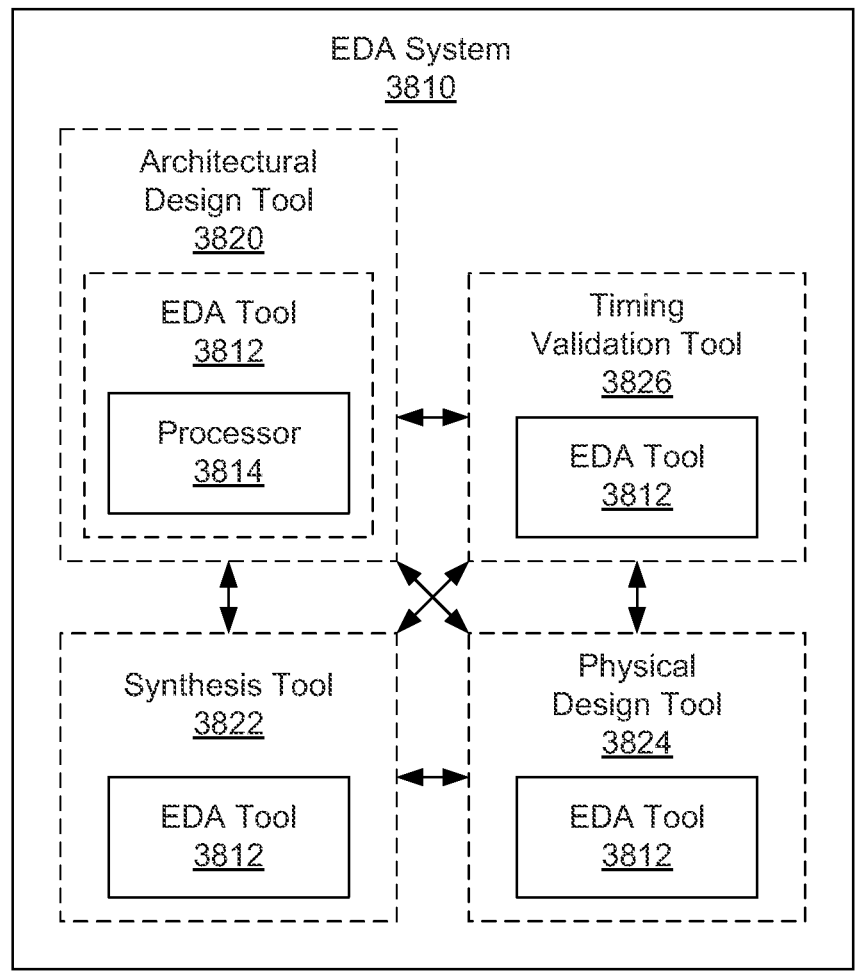
FIG. 38 illustrates a block diagram of an electronic design automation (EDA) tool for clocked tool flows configured for relative timing constraint generation in accordance with an example.

In an example, the characterization information can be represented in a format that is supported by Synopsys design constraint (.sdc), as illustrated in 706, 708, 710, and 718 of FIG. 7. Such constraints as Synopsys design constraints can be general across many of the commercially available tool flows. The technology described herein can generate information to drive synthesis via a synthesis tool 3822, physical design via a physical design tool 3824, and post layout timing validation via a timing validation tool 3826 with these .sdc constraints, which can be represented as a formal relative timing characterization of the module, as illustrated in FIG. 38.

Each set of information can contain similar data, but can be targeted for optimizations based on particular constraints and behaviors of the tools employed. For instance, the methods used for physical design using SoC Encounter and ICC may differ. Each tool can use different characterization information. Likewise, different information may be needed for synthesis using Design Compiler versus place and route using SoC Encounter. The characterization information may be generated via automation.

At least three sets of constraints can be generated. For example, one set of constraints for synthesis, one set of constraints for place and route (or layout design), and one set of constraints for post layout timing (or timing validation). Some sets may have multiple subsets. More or fewer sets of constraints can be generated based on the EDA tool or EDA system configuration.

The synthesis and place and route sets can contain one or more self-consistent set of constraints, as illustrated in 706 of FIG. 7. The set of constraints can be generated from the speed-independent relative timing constraint sets or both the speed-independent and delay-insensitive RT constraints. The set of constraints can include a subset of the RT constraints based on margins and how synthesis and place-and-route utilize the constraints. Various algorithms and methods to determine the constraints and sets of constraints can be developed. The technology described herein provides algorithms, processes, flow, methods, EDA tools, and systems to use constraint sets previously generated by various means.

The post layout timing constraints can use the complete speed-independent and delay-insensitive constraint sets. In an example, the post layout timing constraints can include multiple subsets of self-consistent constraints, where the sum of the Synopsys design constraints (.sdc) cover the RT constraints in both sets, as well as target delay timing information.

Constraint to prevent modification of specified circuit structures (e.g., set_dont_touch constraints or commands) can be generated, as illustrated in 708 of FIG. 7. These circuit structure modification prevention constraints can ensure that the synthesis and place and route tools do not modify the structure of the design. Formal verification can be employed based on a specific gate structure of the design, so if the specific gate structure changes the characterization results may be invalid. FIG. 29 illustrates a set of constraints 2900 for the c_element_nand module to prevent structural modification of the specified elements in the module. In other examples, other representations may also be valid.

Timing in the module and the timing's architectural use can be disabled to ensure the timing graph of the system is a directed acyclic graph (DAG), as illustrated in 710 of FIG. 7. The system architecture can be represented as a DAG for both the module being characterized and how the module is employed in a system. The method of cutting the cycles can differ depending on the module and the module's usage. Expression 4 illustrates an example of cycle cutting for the c_element_nand. In other examples, other representations can also be possible.

set_disable_timing-from B-to Z[find-hier cell c_element_nand3]

set_disable_timing-from C-to Z[find-hier cell c_element_nand3]  Expression 4

Delay targets can be generated based on relative timing constraints, as illustrated in 718 of FIG. 7. In an example, generating delay targets can be automated. For example, the RT constraint sets in FIG. 25, FIG. 28, and Expression 3 can be mapped to Synopsys design constraints (.sdc). Expression 5 illustrates a constraint that can be used to assist in the mapping of the RT constraint sets to the Synopsys design constraints (.sdc).

$$rtc=rtc0:y+=>ay-+m<a-; \quad \text{Expression 5}$$

A database, file, or other methods of representing the constraints can be developed for quick access and to ensure completeness and consistency of the constraints generated.

In an example, the target delay for the two paths and a margin (m) can be determined. The target delay and margin can depend on the design. In an example, the average delay of a gate can be assumed to be 75 picoseconds (ps) in the 180 nm design and a margin of at least one full gate delay between the paths can be used. The delay from y+ to ay− can be assumed to be 75 ps. As a result, the delay from y+ to a− can be at least 150 ps. The determination of the target delay and margin can be design, technology node, or library dependent and can result in a specific design yield.

The delay from pod to $pod_0$ can be modeled with set_max_delay command, as shown in Expression 6 and FIG. 34, where delays are specified in nanoseconds. In the example of Expression 6, the mapping can be made to specific library pins of the circuit where y in the RT constraint maps to pin Z of gate instance c_element_nand3 in the module and ay maps to pin B of the same gate instance. The mapping files specified in FIG. 22 can be used. Several choices of where to select end points can be used. The -fall_to end point of the constraint shown in Expression 6 can be either c_element_nand3/B or c_element_nand1/Z (FIG. 19), which can result in different margins and robustness of the design, and more clearly matches between endpoints, based on the design approach. In another example, if c_element_nand1/Z is used for -fall_to end point, the same gate can be used for endpoints in this constraint and the constraint of Expression 6.

set_max_delay 0.075-rise_from c_element_nand3/Z-fall_to c_element_nand3/B   Expression 6

The delay from pod to $pod_1$ can be modeled with a set_min_delay command, as shown in Expression 7 and FIG. 34, where delays are specified in nanoseconds. In the example of Expression 7, the mapping can be made to specific library pins of the circuit where y in the RT constraint maps to pin Z of gate instance c_element_nand3 in the module and a maps to pin A of gate instance c_element_nand1. The determination of the mapping can be based on the formal verification constraints and causal paths of the constraints as determined by a formal verification engine.

set_min_delay 0.150-rise_from c_element_nand3/Z-fall_to c_element_nand1/A   Expression 7

A pragma (e.g., margin pragma) can be used to relate max_delay and min_delay constraints to each other in the .sdc format. The pragma can be a standardized form of comment, which can have meaning to the compiler or some other tool (e.g., EDA tool). An extension of the max_delay and min_delay constraints can be used to relate these constraints to each other to ensure a sufficient margin (e.g., 75 ps) between events. The pragma (e.g., 'margin' pragma) that is inside a comment (e.g., follows a '#' character) can be employed for the relation between max_delay and min_delay constraints. Expression 8 and FIG. 34 illustrates a 'margin' pragma. In other examples, various pragmas and behaviors for pragmas can be used. The pragma of Expression 8 can first list a max delay path, then a min delay path. The sum of the margin plus the max delay path can be less than or equal to the min delay path. Another pragma (e.g., 'dpmargin' pragma) can have half of the max delay path plus the margin to be less than the min delay path. In other example, other margin behaviors can also be defined and specified. In another example, at least one margin can be defined for each relative timing constraint. In another configuration, the "#margin" or "#dpmargin" pragmas can be used in a CAD to correctly perform timing closure, as described in co-pending U.S. patent application Ser. No. 13/945,843, entitled "RELATIVE TIMING ARCHITECTURE", filed Jul. 18, 2013.

margin 0.075-rise_from c_element_nand3/Z-fall_to c_element_nand3/B-rise_from c_element_nand3/Z-fall_to c_element_nand1/A   Expression 8

In another configuration, a margin constraint may not be present in the various constraint sets (e.g., synthesis, place and route, or post layout timing constraint sets). For instance, if the min-delay is one-sixth the max delay in a particular relative timing constraint, the margin constraint may not need to be specified in the set of constraints generated for synthesis.

A set of endpoint mappings for inputs 3000 can generated, as illustrated in FIG. 30. In an example, the set of endpoint mappings for inputs can reside in a database for lookup to determine pin names for signals based on a cut set of the module. The set of endpoint mappings for inputs can differ based on the tool and cut set used. For example, Design Compiler may cut the timing graph at the endpoints of set_max_delay and set_min_delay constraints, but SoC Encounter may not. The timing graph cuts can result in different endpoint definitions for a gate depending on the usage. FIG. 30 illustrates a definition 3000 of the end points for signals A and B in a design based on the constraint set being used. In an example, the endpoints for the design 1900 (FIG. 19) can be specified in FIG. 30. The definitions can be a complete set of a subset of actual input gate endpoints in a design. A mechanism for representing and mapping between input pins and actual pin names can also be specified, as illustrated in FIG. 30.

Due to cycle cutting or netlist connectivity, all endpoints of an input may not pass through to an output. A set of input signal pins that map to output pins 3100 can also be specified, as illustrated in FIG. 31.

Pins that drive the clock can have different defined behavior than other pins in these modules. The "$name" syntax can allows the endpoint and pin mappings to be general and to be mapped at run time based on the design and module.

Variables can be provided for delays that are used in sdc scripts. In an example, EDA tools can support Tool Command Language (Tcl) variables, so the delays can be specified as Tcl variables 3200, as illustrated in FIG. 32. As a result, margins or delays can be specified with these Tcl variables, as shown in Expression 9 and FIG. 34. Tcl can be used for rapid prototyping, scripted applications, and testing used on embedded systems platforms.

set_max_delay $GATE_DELAYS_1-rise_from c_element_nand3/Z-fall_to c_element_nand3/B   Expression 9

When relative timing endpoints exist outside of a current module, a modification of syntax can be used to reference an upstream instance, a local instance, and a downstream instance in a relative timing endpoints constraints mapping. In an example, the controllers 342, 344, 346 (FIG. 3) can be built as Sutherland Micropipelines. These controllers can include a c-element and an inverter. FIG. 33 illustrates a design 3300 for the controllers, as specified in Verilog. The relative timing constraint of Expression 10 (also illustrated in and FIG. 34) can be used to ensure that from the arrival of left request (lr) to controller 344, data 320 arrives to latch 316 before the clock signal 330.

$rtc=rtc2\$i1/\$lr=>\$i2/\$d<\$i2/\$clk$   Expression 10

Mapping between adjacent design instances can be provided. A general reference mechanism can be used where the variable $i1 refers to a local instance (or current instance) being characterized (e.g., 344 in FIG. 3). The variable $i2 can refer to downstream instances (e.g. 346 and 316) that are adjacent to the local instance and $i0 can refer to upstream instances (e.g. 342 and 312). The definition for downstream and upstream instances can include the controller being characterized (e.g. a Sutherland Micropipeline smp) and an associated latch or flop bank that is being controlled by the controller (e.g. 312 by 342, 314 by 344, and 316 by 346). Generally, downstream instances can use a higher number (e.g., $i2), upstream instances can use a lower number (e.g., $i0), and the local instance can use a number (e.g., $i1) between the upstream instances and the downstream instances.

Relative mapping between adjacent design instances, as previously described, can be extended to all constraints, so the relative timing constraints and mapped constraints 3400 can be represented as illustrated in FIG. 34. Relative mapping of instance references can simplify the mapping of these constraints to actual instances in a design. Self-contained constraints can use the $i1 instance names to ensure self-referential timing constraints. Clock constraints can map to the locally controlled clock pin, so that $i1/clk for controller 344 can refer to the clock pins in the latch bank 314.

A physical layout of the cell can determine the cell area. The technology described herein can provide area information to assist a circuit designer or the CAD tools to select characterized modules to use in the design. Any physical design tool, such as ICC or SoC Encounter, may be used. The area can be measured and reported with a pragma, as illustrated in Expression 11.

AREA 138 um2            Expression 11

The post-layout design can be simulated to determine performance and power. The technology described herein can provide timing information to help the designer or CAD tools select characterized modules to use in the design. Any simulation tool, such as ModelSim, may be used. The simulation can use the post layout values from physical layout of the cell, which can include back annotated delays and parasitics. FIG. 35 illustrates a report 3500 of the post layout values.

Additional simulation information can also be included. Delays can include max delays or min delays, and if either type of delays are needed, max delays can be specified as MAX_DELAY, or min delays can be specified as MIN_DELAY. The max delays or min delays can also be characterized in signal slope/load tables, similar to other gates in a cell library.

For a characterization of asynchronous modules, various relative timing constraints, processes, and reports can be generated, such as sets of speed-independent RT constraints, a set of delay-insensitive RT constraints, causal paths for each of these constraint sets, several pin-to-pin post-layout delays for a reasonably sized load, typical delays for internal gates of the design, target delays for RT constraint paths, suggested margins between points-of-convergence (poc) for RT constraints, the criticality of the constraint based on synthesis and place and route, total area of the module, cycle time for the module, energy of operation for the module, formal specification of the module, CCS implementation for the module, the set_size_only and set_dont_touch constraints, the set_disable_timing constraints, a set of PROVIDES constraints for input-to-output paths for the design with special conditions for clock pins and others if needed, a set of gate endpoints for inputs of a design, mapping of RT constraint sets to set_max_delay, set_min_delay and #margin pragmas, or a method of mapping endpoints to adjacent gates (e.g., the $i0, $i1, or $i2 approach).

The technology described herein can be sufficient to create Synopsys design constraints (sdc) and additional methods that enable the usage of industry standard EDA tools for the synthesis, physical design, and validation of a system that employs these characterized modules.

Figure 36:
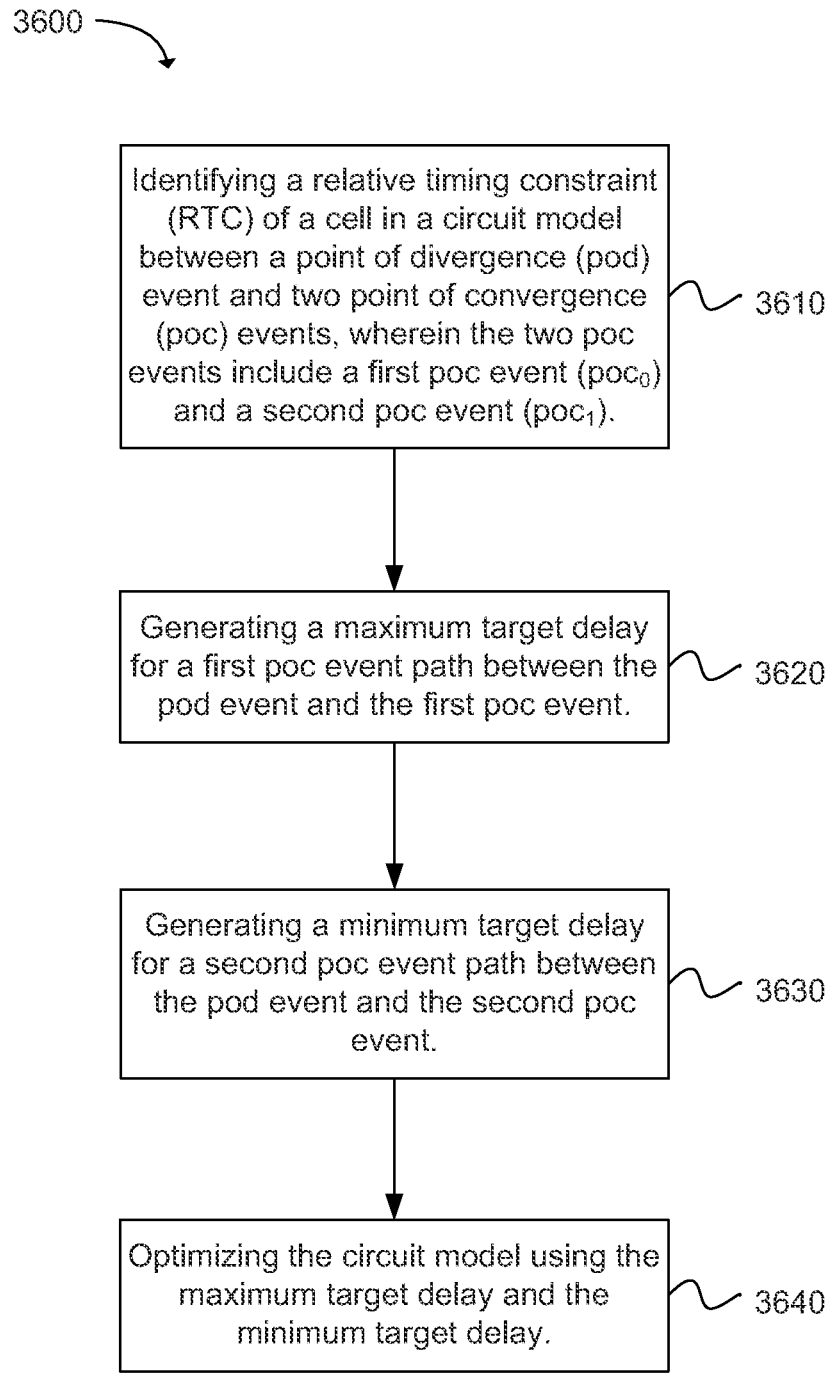
FIG. 36 depicts a flow chart of a method for relative timing characterization enabling use of clocked electronic design automation (EDA) tool flows in accordance with an example.

Another example provides a method 3600 for relative timing characterization enabling use of clocked electronic design automation (EDA) tool flows, as shown in the flow chart in FIG. 36. The method may be executed as instructions on a machine or computer circuitry, where the instructions are included on at least one computer readable medium or one non-transitory machine readable storage medium. The method includes the operation of identifying a relative timing constraint (RTC) of a cell in a circuit model between a point of divergence (pod) event and two point of convergence (poc) events, wherein the two poc events include a first poc event ($poc_0$) and a second poc event ($poc_1$), as in block 3610. The operation of generating a maximum target delay for a first poc event path between the pod event and the first poc event follows, as in block 3620. The next operation of the method can be generating a minimum target delay for a second poc event path between the pod event and the second poc event, as in block 3630. The method can further include optimizing the circuit model using the maximum target delay and the minimum target delay, as in block 3640.

In an example, the operation of identifying the relative timing can further include mapping the relative timing to a Synopsys design constraint (.sdc) file format. In another example, the relative timing can be represented by $pod \mapsto poc_0 + m \prec poc_1$, where pod is the point of divergence event, $poc_0$ is a first point of convergence event to occur before a second point of convergence event $poc_1$ for proper circuit operation, and margin m is a minimum separation between the $poc_0$ and the $poc_1$. Each of the pod, the $poc_0$, and the $poc_1$ can be an input, output, or pin connection.

In another configuration, the method can further include generating a margin pragma to relate the maximum target delay to the minimum target delay based in the margin m. In another example, prior to generating target delays, the method can further include: Identifying a relative timing path to keep intact within a cell of a circuit model; and generating a "do not modify" constraint for the relative timing path used during synthesis and place and route EDA tool flows. The cell can include a gate, and the "do not modify" constraint can includes a set_size_only constraint to prevent a structural modification of the cell but allow optimization of a drive strength of the cell, or the "do not modify" constraint can include a set_dont_touch constraint to disallow a modification of the cell.

In another configuration, the method can further include: Generating endpoint mappings for input endpoints to input pin names of the cell; and mapping the input endpoints to output pin names. In another example, the operation of optimizing the circuit model can further include adding delay elements into the circuit to satisfy the relative timing constraint.

In another configuration, the method can further include: Mapping a local endpoint within the cell and an external endpoint outside the cell; identifying an external relative timing constraint (RTC) between the local endpoint and the external endpoint with a point of divergence (pod) event and two point of convergence (poc) events; generating an external maximum target delay and an external minimum target delay for the external RTC; and optimizing the circuit model using the external maximum target delay and the external minimum target delay. The local endpoint can use an output from the external endpoint or provides an input to the external endpoint.

Figure 37:
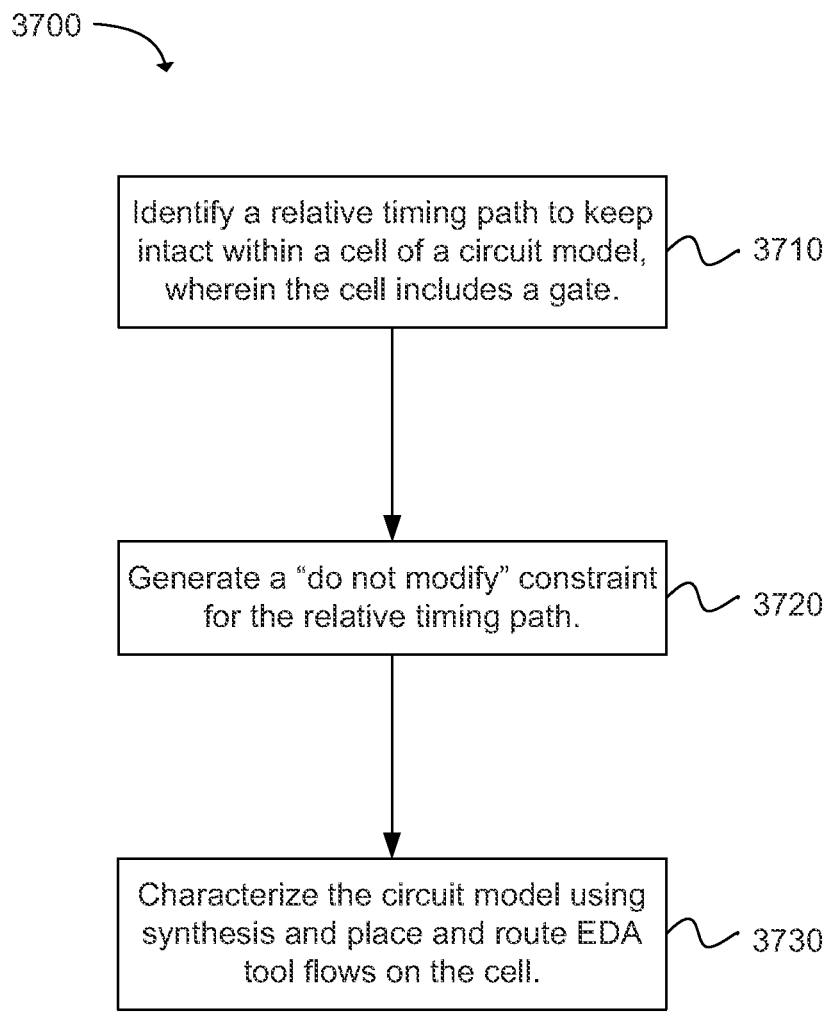
FIG. 37 depicts functionality of computer circuitry of an electronic design automation (EDA) tool for clocked tool flows configured for relative timing characterization in accordance with an example.

Another example provides functionality 3700 of computer circuitry of an electronic design automation (EDA)

tool for clocked tool flows configured for relative timing characterization, as shown in the flow chart in FIG. 37. The functionality may be implemented as a method or the functionality may be executed as instructions on a machine, where the instructions are included on at least one computer readable medium or one non-transitory machine readable storage medium. The computer circuitry can be configured to identify a relative timing path to keep intact within a cell of a circuit model, wherein the cell includes a gate, as in block 3710. The computer circuitry can be further configured to generate a "do not modify" constraint for the relative timing path, as in block 3720. The computer circuitry can also be configured to characterize the circuit model using synthesis and place and route EDA tool flows on the cell, as in block 3730.

In an example, the "do not modify" constraint can include a set_size_only constraint to prevent a modification of gate logic behavior of the cell but allows optimization of a drive strength of the cell, or the "do not modify" constraint can include a set_dont_touch constraint to disallow a modification of the cell.

In another example, the computer circuitry can be further configured to generate a cell library formal model of the circuit model. The cell library formal model can include a semi-modular model or boolean model; a logic header file to map Boolean logic to inputs and outputs of a function to specific states; and a pin header file to map a master name representation to an instance pin name. The master name representation can use a structural hardware description language (HDL) representation and the instance pin name can use a formal model instance The formal model can use a calculus of communicating systems (CCS) instance, state graphs, and symbolic transition graphs (STG). The computer circuitry can be further configured to: Generate a design module formal model of the circuit model including an initial state, and sets of inputs and outputs; generate causal paths between inputs and outputs for the circuit model; generate speed independent relative timing constraints for synthesis for the circuit model; and generate delay-insensitive relative timing constraints including wire delay for validation for the circuit model. The speed independent relative timing constraints and the delay-insensitive relative timing constraints can provide correct operation of the circuit model.

In another configuration, the computer circuitry can be further configured to generate architecture performance constraints for the circuit model. The architecture performance constraints can include synthesis constraints; place and route constraints; and post layout timing constraints. The synthesis constraints, the place and route constraints, and the post layout timing constraints can use speed independent relative timing constraints and delay-insensitive relative timing constraints including wire delay.

In another example, the computer circuitry can be further configured to cut a relative timing cycle for the circuit model using a .sdc format to create directed acyclic graph (DAG) while preserving the relative timing path with the "do not modify" constraint. The "do not modify" constraint can include a "set_disable_timing" constraint. In another configuration, the computer circuitry can be further configured to: Characterize the cell with characterization parameters including a cycle time, forward or backward latency, pipelining characteristics, rise or fall times of internal gates, directed acyclic graph (DAG) delays, power and energy per operation, or area modify pipelining characteristics to behavioral and pipelining characteristics; and modify a characterization module for the cell in a cell library delay file using a liberty (.lib) file when a characterization parameter changes.

In another example, the computer circuitry can be further configured to: Identify a relative timing constraint (RTC) in the circuit model between a point of divergence (pod) event and two point of convergence (poc) events, where the relative timing is represented by $pod \prec poc_0 + m \mapsto poc_1$, where pod is the point of divergence event, $poc_0$ is a first poc event to occur before a second poc event $poc_1$ for proper circuit operation, and margin m is a minimum separation between the $poc_0$ and the $poc_1$; generate a maximum target delay for a first poc event path between the pod event and the first poc event; generate a minimum target delay for a second poc event path between the pod event and the second poc event; and optimize the circuit model using the maximum target delay and the minimum target delay. In a configuration, the computer circuitry configured to optimize the circuit model can be further configured to add delay elements into the cell to satisfy the relative timing constraint. In another example, the computer circuitry can be further configured to: Generate endpoint mappings for input endpoints to input pin names; and map the input endpoints to output pin names.

FIG. 38 illustrates an example electronic design automation (EDA) tool 3812 for clocked tool flows configured for relative timing constraint generation including a processor 3814. In an example, the processor can be configured to implement the method as described in 3600 of FIG. 36. In another example, the processor can be configured to implement the computer circuitry as described as described in 3700 of FIG. 37.

In an example, the processor 3814 (FIG. 38) can be configured to: Identify a relative timing constraint (RTC) of a cell in a circuit model between a point of divergence (pod) event and two point of convergence (poc) events, where the two poc events include a first poc event ($poc_0$) and a second poc event ($poc_1$); generate a maximum target delay for a first poc event path between the pod event and the first poc event; generate a minimum target delay for a second poc event path between the pod event and the second poc event; generate a margin pragma representing a minimum separation between the first poc event and the second poc event; and optimize the circuit model using the maximum target delay, the minimum target delay, and the margin pragma.

In another example, the relative timing constraint (RTC) can be represented by $pod \mapsto poc_0 + m \prec poc_1$, where pod is the point of divergence (pod) event, $poc_0$ is a first point of convergence (poc) event to occur before a second poc event $poc_1$ for proper circuit operation, and margin m represented in the margin pragma is a minimum separation between the $poc_0$ and the $poc_1$.

In another configuration, the processor 3814 can be configured to: Identify a relative timing path to keep intact within a cell of a circuit model, wherein the cell includes a gate; and generate a "do not modify" constraint for the relative timing path used during synthesis and place and route EDA tool flows. The "do not modify" constraint can include a set_size_only constraint to prevent a structural modification of the cell but allows optimization of a drive strength of the cell, or the "do not modify" constraint can include a set_dont_touch constraint to disallow a modification of the cell.

In another example, the processor 3814 configured to optimize the circuit model can be further configured to: Add delay elements into the cell to satisfy the relative timing constraint; generate endpoint mappings for input endpoints to input pin names; and map the input endpoints to output pin names.

In another configuration, an electronic design automation (EDA) system 3810 using the EDA tool 3812 can include an architectural design tool 3820, a synthesis tool 3822, a place and route tool, a post layout timing tool, a physical design tool 3824, or a timing validation tool 3826. The EDA tool can use a hardware description language (HDL), very-high-speed integrated circuits (VHSIC) HDL (VHDL), Verilog, a cell library, Synopsys design constraint (.sdc), Synopsys Integrated Circuit Compiler (ICC), Encounter Digital Implementation (EDI), Cadence System on Chip (SoC) Encounter, Concurrency Workbench, Design Compiler, Encounter Register Transfer Level (RTL), Xilinx Integrated Software Environment (ISE), Xilinx Synthesis Tool (XST), Quartus, Synplify, LeonardoSpectrum, Precision, Primetime, Tempus, Modelsim, Eldo, Simulation Program with Integrated Circuit Emphasis (SPICE), Verilog Compiled Simulator (VCS), or Cadence Verilog-L tier extension (Verilog-XL).

In another example, an electronic design automation (EDA) system 3810 using the EDA tool 3812 can be used to generate an integrated circuit (IC). The EDA system can include an architectural design tool 3820, a synthesis tool 3822, a physical design tool 3824, and a timing validation tool 3826. The architectural design tool can include the EDA tool to design and characterize an integrated circuit (IC) architecture by encoding characterization information, cell library information, and architectural performance targets using a hardware description language (HDL). In an example, the architectural design tool can use Verilog, Hardware Description Language (HDL), or very-high-speed integrated circuits (VHSIC) HDL (VHDL). The synthesis tool can include the EDA tool to generate hardware logic to implement behavior of the HDL. In an example, the synthesis tool can use Synopsys design constraint (.sdc), Design Compiler, Encounter Register Transfer Level (RTL), Xilinx Integrated Software Environment (ISE), Xilinx Synthesis Tool (XST), Quartus, Synplify, LeonardoSpectrum, or Precision. The physical design tool can include the EDA tool to place and route hardware circuitry based on the hardware logic. In an example, the physical design tool can use Synopsys Integrated Circuit Compiler (ICC), Cadence Encounter Digital Implementation (EDI), or Cadence System on Chip (SoC) Encounter. The timing validation tool can include the EDA tool to verify hardware circuitry for performance, correctness, and yield using speed-independent timing constraints and delay-insensitive timing constraints. In an example, the timing validation tool can use Primetime, Tempus, Modelsim, Eldo, Simulation Program with Integrated Circuit Emphasis (SPICE), Verilog Compiled Simulator (VCS), or Cadence Verilog-L tier extension (Verilog-XL).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays (FPGA), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for relative timing characterization enabling use of clocked electronic design automation (EDA) tool flows, comprising:
   identifying a relative timing constraint (RTC) of a cell in a circuit model between a point of divergence (pod) event and two point of convergence (poc) events, wherein the relative timing constraint is represented by $pod \mapsto poc_0 + m \prec poc_1$, where pod is the point of divergence event, $poc_0$ is a first point of convergence event to occur before a second point of convergence event $poc_1$ for proper circuit operation, and margin m is a minimum separation between the $poc_0$ and the $poc_1$;
   generating a maximum target delay for a first poc event path between the pod event and the first poc event;
   generating a minimum target delay for a second poc event path between the pod event and the second poc event; and
   generating a margin pragma to relate the maximum target delay to the minimum target delay based in the margin;
   optimizing, by a processor, the circuit model using the maximum target delay and the minimum target delay; and
   fabricating an integrated circuit chip based on the circuit model.

2. The method of claim 1, wherein identifying the relative timing further comprises:
   mapping the relative timing to a Synopsys design constraint (.sdc) file format.

3. The method of claim 1, further comprising prior to generating target delays:
   identifying a relative timing path to keep intact within a cell of a circuit model, wherein the cell includes a gate; and
   generating a "do not modify" constraint for the relative timing path used during synthesis and place and route EDA tool flows, wherein the "do not modify" constraint includes a set_size_only constraint to prevent a structural modification of the cell but allows optimization of a drive strength of the cell, or the "do not modify" constraint includes a set_dont_touch constraint to disallow a modification of the cell.

4. The method of claim 1, further comprising:
   generating endpoint mappings for input endpoints to input pin names of the cell; and
   mapping the input endpoints to output pin names.

5. The method of claim 1, wherein optimizing the circuit model further comprises:
   adding delay elements into the circuit to satisfy the relative timing constraint.

6. The method of claim 1, further comprising:
   mapping a local endpoint within the cell and an external endpoint outside the cell, wherein the local endpoint uses an output from the external endpoint or provides an input to the external endpoint;
   identifying an external relative timing constraint (RTC) between the local endpoint and the external endpoint with a point of divergence (pod) event and two point of convergence (poc) events;
   generating an external maximum target delay and an external minimum target delay for the external RTC; and
   optimizing the circuit model using the external maximum target delay and the external minimum target delay.

7. The method of claim 6, wherein mapping a local endpoint within the cell and an external endpoint outside the cell further comprises:
   identifying a plurality of paths of a local instance of the circuit model using a first identifier; and
   identifying a plurality of paths of an external instance of the circuit model using a second identifier.

8. The method of claim 7, further comprising generating "do not modify" constraints for the plurality of paths identified by the first identifier.

9. The method of claim 1, wherein each of the pod, the $poc_0$, and the $poc_1$ is an input, output, or pin connection.

10. At least one non-transitory machine readable storage medium comprising a plurality of instructions adapted to be executed to implement the method of claim 1.

11. The method of claim 1, further comprising:
    identifying a plurality of sub-paths of the relative timing constraint;
    generating timing targets for a subset of the plurality of sub-paths to match the minimum target delay and the maximum target delay; and
    creating a reset logic for the circuit model.

12. An electronic design automation (EDA) tool for clocked tool flows configured for relative timing characterization, having computer circuitry configured to:
    identify a relative timing path to keep intact within a cell of a circuit model, wherein the cell includes a gate;
    generate a "do not modify" constraint for the relative timing path;
    characterize the circuit model using synthesis and place and route EDA tool flows on the cell;
    generate a cell library formal model of the circuit model;

a semi-modular model or boolean model, wherein the formal model uses a calculus of communicating sysesm (CCS) instance, state graphs, and symbolic transition graphs (STG);

a logic header file to map Boolean logic to inputs and outputs of a function to specific states; and a pin header file to map a master name representation to an instance pin name, wherein the master name representation uses a structural hardware description language (HDL) representation and the instance pin name uses a fomal model instance;

generate a design module formal model of the circuit model including an initial state, and sets of inputs and outputs;

generate causal paths between inputs and outputs for the circuit model;

generate speed independent relative timing constraints for synthesis for the circuit model; and generate delay-insensitive relative timing constraints including wire delay for validation for the circuit model, wherein the speed independent relative timing constraints and the delay-insensitive relative timing constraints provide correct operation of the circuit model;

wherein the EDA tool is used to fabricate an integrated circuit chip based on the circuit model.

13. The computer circuitry of claim 12, wherein the "do not modify" constraint includes a set_size_only constraint to prevent a modification of gate logic behavior of the cell but allows optimization of a drive strength of the cell, or the "do not modify" constraint includes a set_dont_touch constraint to disallow a modification of the cell.

14. The computer circuitry of claim 12, wherein the computer circuitry is further configured to:

generate architecture performance constraints for the circuit model including:
synthesis constraints;
place and route constraints; and
post layout timing constraints, wherein the synthesis constraints, the place and route constraints, and the post layout timing constraints use speed independent relative timing constraints and delay-insensitive relative timing constraints including wire delay.

15. The computer circuitry of claim 12, wherein the computer circuitry is further configured to:

cut a relative timing cycle model using a .cstr format to create directed acyclci graph (DAG) while preserving the relative timing path with the "do not modify" constraint, wherein the "do not modify" constraint includes a "set_disable_timing" constraint.

16. The computer circuitry of claim 12, wherein the computer circuitry is further configured to:

characterize the cell with characterization parameters including a cycle time, forward or backward latency, pipelining characteristics, rise or fall times of internal gaes, directed acyclic graph (DAG) delays, power and energy per operation, or area modify pipelining characteristics to behaviroal and pipelining characteristics; and modify a characterization module for the cell in a cell library delay file using a liberty (.lib) file when a characterization parameter changes.

17. The computer circuitry of claim 12, wherein the computer circuitry is further configured to:

identify a relative timing constraint (RTC) in the circuit model between a point of divergence (pod) event and two point of convergence (poc) events, wherein the relative timing is represented by pod $\mapsto$ poc$_0$+m $\prec$ poc$_1$, where pod is the point of divergence event, poc$_0$ is a first poc event to occur before a second poc event poc$_1$ for proper circuit operation, and margin m is a minimum separation between the poc$_0$ and the poc$_1$;

generate a maximum target delay for a first poc event path between the pod event and the first poc event;

generate a minimum target delay for a second poc event path between the pod event and the second poc event; and optimize the circuit model using the maximum target delay and the minimum target delay.

18. The computer circuitry of claim 17, wherein the computer circuitry configured to optimize the circuit model is further configured to:

add delay elements into the cell to satisfy the relative timing constraint.

19. The computer circuitry of claim 12, wherein the computer circuitry is further configured to:

generate endpoint mappings for input endpoints to input pin names; and map the input endpoints to output pin names.

20. An electronic design automation (EDA) tool for clocked tool flows configured for relative timing constraint generation, comprising:

a processor to:
identify a relative timing constraint (RTC) of a cell in a circuit model between a point of divergence (pod) event and two point of convergence (poc) events, wherein the two poc events include a first poc event (poc$_0$) and a second poc event (poc$_1$);

generate a maximum target delay for a first poc event path between the pod event and the first poc event;

generate a minimum target delay for a second poc event path between the pod event and the second poc event;

generate a margin pragma representing a minimum separation between the first poc event and the second poc event; and optimize the circuit model using the maximum target delay, the minimum target delay, and the margin pragma;

wherein the EDA tool is used to generate an integrated circuit chip based on the circuit model.

21. The EDA tool of claim 20, wherein the relative timing is represented by, where pod is the point of divergence event, poc$_0$ is a first point of convergence event to occur before a second point of convergence event poc$_1$ for proper circuit operation, and margin m represented in the margin pragma is a minimum separation between the poc$_0$ and the poc$_1$.

22. The EDA tool of claim 20, wherein the processor is further configured to:

identify a relative timing path to keep intact within a cell of a circuit model, wherein the cell includes a gate; and generate a "do not modify" constraint for the relative timing path used during synthesis and place and route EDA tool flows, wherein the "do not modify" constraint includes a set_size_only constraint to prevent a structural modification of the cell but allows optimization of a drive strength of the cell, or the "do not modify" constraint includes a set_dont_touch constraint to disallow a modification of the cell.

23. The EDA tool of claim 20, wherein the processor configured to optimize the circuit model is further configured to:

add delay elements into the cell to satisfy the relative timing constraint;

generate endpoint mappings for input endpoints to input pin names; and map the input endpoints to output pin names.

24. The EDA tool of claim 20, wherein the EDA tool includes at least one of a synthesis tool, a place and route tool, a post layout timing tool, a physical design tool, or a timing validation tool using a hardware description language (HDL), very-high-speed integrated circuits (VHSIC) HDL (VHDL), Verilog, a cell library, Synopsys design constraint (.sdc), Synopsys Integrated Circuit Compiler (ICC), Encounter Digital Implementation (EDI), Cadence System on Chip (SoC) Encounter, Concurrency Workbench, Design Compiler, Encounter Register Transfer Level (RTL), Xilinx Integrated Software Environment (ISE), Xilinx Synthesis Tool (XST), Quartus, Synplify, LeonardoSpectrum, Precision, Primetime, Tempus, Modelsim, Eldo, Simulation Program with Integrated Circuit Emphasis (SPICE), Verilog Compiled Simulator (VCS), or Cadence Verilog-L tier extension (Verilog-XL).

* * * * *